United States Patent
Zhang et al.

(10) Patent No.: US 12,468,899 B2
(45) Date of Patent: Nov. 11, 2025

(54) HALLUCINATION PREVENTION FOR NATURAL LANGUAGE INSIGHTS

(71) Applicant: ADOBE INC., San Jose, CA (US)

(72) Inventors: Wei Zhang, Great Falls, VA (US); Victor Soares Bursztyn, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 242 days.

(21) Appl. No.: 18/321,602

(22) Filed: May 22, 2023

(65) Prior Publication Data

US 2024/0378400 A1    Nov. 14, 2024

Related U.S. Application Data

(60) Provisional application No. 63/500,871, filed on May 8, 2023.

(51) Int. Cl.
*G06F 40/40* (2020.01)
*G06F 40/186* (2020.01)

(52) U.S. Cl.
CPC ............ *G06F 40/40* (2020.01); *G06F 40/186* (2020.01)

(58) Field of Classification Search
None
See application file for complete search history.

(56) References Cited

U.S. PATENT DOCUMENTS

| | | | | |
|---|---|---|---|---|
| 11,966,704 B1 * | 4/2024 | Magary | | G06F 40/30 |
| 12,067,366 B1 * | 8/2024 | Heller | | G06F 40/35 |
| 12,217,013 B2 * | 2/2025 | Sabapathy | | G06F 40/35 |
| 2023/0252225 A1 * | 8/2023 | Zhelezniak | | G06N 5/01 |
| | | | | 715/254 |
| 2023/0274086 A1 * | 8/2023 | Tunstall-Pedoe | | G06F 40/20 |
| | | | | 704/9 |
| 2023/0274089 A1 * | 8/2023 | Tunstall-Pedoe | | G06F 40/40 |
| | | | | 704/2 |
| 2023/0274094 A1 * | 8/2023 | Tunstall-Pedoe | | G06F 40/30 |
| | | | | 704/9 |
| 2024/0289395 A1 * | 8/2024 | Zhou | | G06F 16/9532 |
| 2024/0296295 A1 * | 9/2024 | Russell | | G06F 40/56 |
| 2024/0330755 A1 * | 10/2024 | Kumar | | G06N 20/00 |

OTHER PUBLICATIONS

Dong, Yue, John Wieting, and Pat Verga. "Faithful to the document or to the world? mitigating hallucinations via entity-linked knowledge in abstractive summarization." arXiv preprint arXiv:2204.13761 (2022). (Year: 2022).*

* cited by examiner

*Primary Examiner* — Douglas Godbold
(74) *Attorney, Agent, or Firm* — Shook, Hardy & Bacon L.L.P.

(57) ABSTRACT

Methods and systems are provided for hallucination prevention for natural language insights. In embodiments described herein, a template-based insight with a set of facts is generated by a template-based insights engine. The set of facts are generated from a set of data and the template-based insight is generated based on a text template. A natural language insight is generated from the template-based insight through a language model. If a threshold number of facts of the template-based insight are missing from the natural language insight as determined by a hallucination gatekeeper engine then a new natural language insight is generated from the template-based insight through the language model.

20 Claims, 8 Drawing Sheets

HALLUCINATION PREVENTION FOR NATURAL LANGUAGE INSIGHTS

CROSS-REFERENCE TO RELATED APPLICATIONS

This application is a Non-Provisional of U.S. Provisional Patent Application No. 63/500,871, filed May 8, 2023, entitled "HALLUCINATION PREVENTION FOR NATURAL LANGUAGE INSIGHTS," which is incorporated herein by reference in its entirety.

BACKGROUND

Generative artificial intelligence (AI) technologies, including the most advanced large language models (LLM), such as ChatGPT™ from OpenAI® or Flan-T5™ from Google®, can produce content that is unfaithful-a problem known as hallucinations. A hallucination refers to cases where the language model generates output text unrelated to or unsupported by the input. In this regard, the output generated by the language model generates is false, as opposed to being based on the input data or context. A user relying on output text of a language model with a hallucination would be relying on incorrect data.

SUMMARY

Various aspects of the technology described herein are generally directed to systems, methods, and computer storage media for, among other things, hallucination prevention for natural language insights. In this regard, embodiments described herein facilitate preventing the presentation of hallucinations in natural language insights from language models in order to increase the reliability of insights generated by a language model. For example, insights can be generated regarding a business in order to facilitate understanding of the reasons behind various data events, predicting future trends, and recommending possible actions for optimizing outcomes. Facts within each insight can be determined from stored data regarding the business and output into a text template to generate template-based insights. A language model is then utilized to transform the template-based insights into natural language insights. The natural language insights is checked for hallucinations by a hallucination gatekeeper engine. The hallucination gatekeeper engine checks the natural language insight to ensure that each fact of the template-based insight is located in the natural language insight, fix errors caused by a hallucination, and/or check for redundant or additional numerical facts in the natural language insight. In this way, the hallucination gatekeeper engine prevents the presentation of hallucinations in natural language insights from language models in order to increase the reliability of insights generated by a language model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
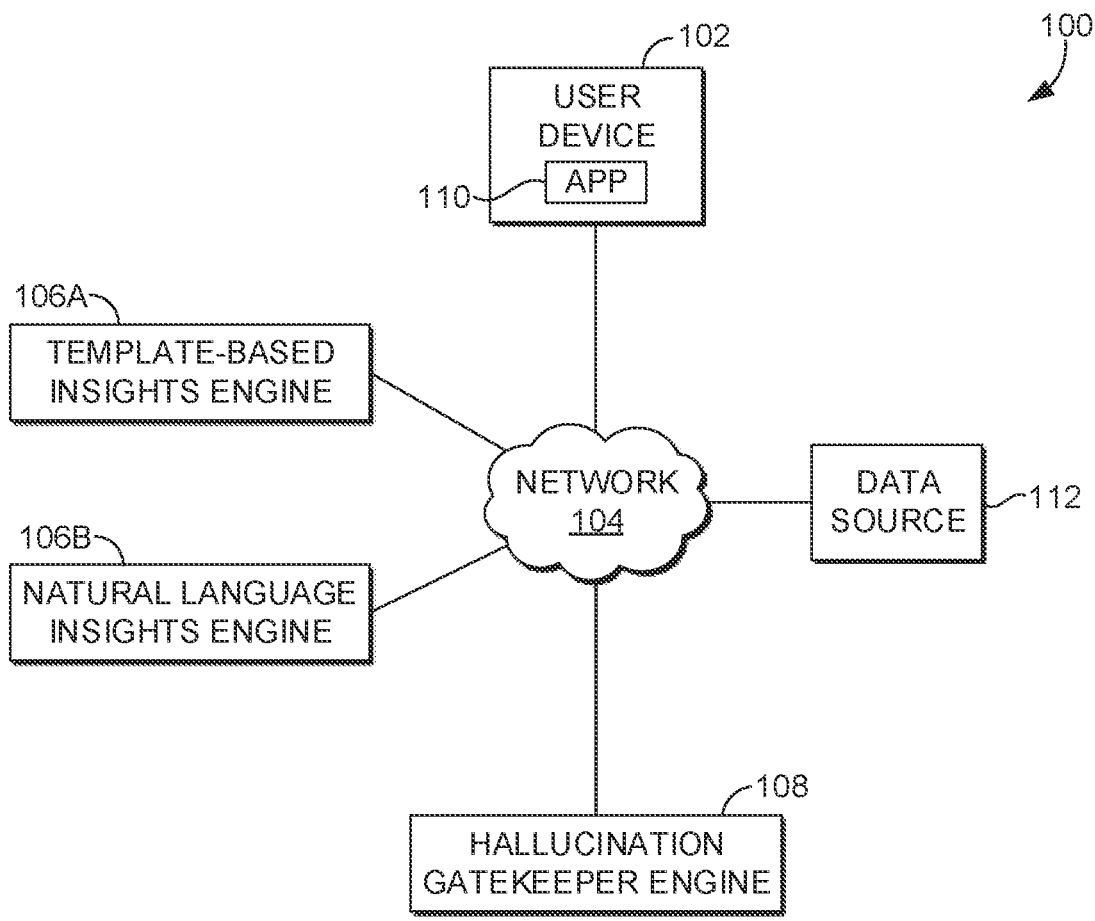
FIG. 1 depicts a diagram of an environment in which one or more embodiments of the present disclosure can be practiced, in accordance with various embodiments of the present disclosure.

Various terms are used throughout the description of embodiments provided herein. A brief overview of such terms and phrases is provided here for ease of understanding, but more details of these terms and phrases is provided throughout.

A "fact" refers to integers and/or strings generated from a set of data. In embodiments, an "insight" refers to a sentence (or sentences) generated to describe the data and facilitates understanding of the reasons behind various data events, predicts future trends, and/or recommends possible actions for optimizing outcomes. Insights and facts are broadly used herein and may refer to any insights or facts in the form of text and/or visual depictions associated with a dataset(s) and/or data visualization. For example, an insight may report a fact(s) or information related to a metric presented in a displayed data visualization, such as mean, minimum value, maximum value, average value, etc. for a metric, dimension, period of time for a set of data, etc. for a set of data. In the example, the mean, minimum value, maximum value, average value, etc. is a fact and the metric, dimension and/or period of time, etc. is also a fact. By way of example only, in association with a graph presenting revenue over time, an insight may indicate facts representing a lowest revenue for a particular time period, a highest revenue for a particular time period, an average revenue over a time period, etc. Other insights/facts may be identified in association with the identified revenue (e.g., lowest revenue), etc. For example, an insight that may be presented may be "The lowest amount of revenue happened on May 3rd as $537.38. It was 20% less than average." This insight describes the lowest revenue for a particular period and also indicates the average trend. The facts within the insight include "'revenue', 'May $3^{rd}$', '537.38', and '20%.'" Insights/facts can be generated for any data that a business/entity/individual tracks. For example, the data may track a customer journey, such as social media, email, website visits, etc. in order to provide data regarding the customer journey. The data can track customers across various customer attributes, such as age, location, purchasing behavior, etc. to determine customer segmentation trends. The data can track the website performance of a business (or any individual or organization that desired to track website performance), such as page load times, bounce rates, conversion rates, etc. The data can track marketing campaign performance, such as performance of marketing campaigns across various channels, etc. The data can track customer behavior to predict customer behavior based on historical data. These examples of data used for generating insights are described for exemplary purposes. Any type of data can be obtained or used in order to provide insights/facts, such as, for example, data trends or data points (e.g., anomalies, etc.).

A "template-based insight" refers to an insight with a number of facts determined from data (stored data) and output into a text template. By way of example only, template-based insights can be generated for cyclic patterns, changes, extremum data (minimum, maximum), etc. To do so, a text template may be referenced and used to insert identified data into the placeholders of the text template. For example, assume a template is "The period from _____ to _____ had the greatest revenue of _____." Further assume that the period of January 1 to February 1 is identified as having the greatest revenue of $10 million. In such a case, the appropriate template may be identified to insert the identified facts into the template to generate the template-based insight of "The period from January 1 to February 1 had the greatest revenue of $10 million." As another example, a template-based insight can be used to provide predicted or forecasted data. In this regard, based on current trends, probable facts or data associated with future events can be identified. One example of a template-based insight that may be generated is "The revenue will be continuously decreasing in 7 days. By this time the lowest revenue can be 339.11." As another example, template-based insight can be used to explain the reasons an event(s) occurs. For instance, assume a template-based insight is generated as follows: "In Georgia, revenue decreased significantly from 2021-04-29 to 2021-05-03 as compared to what was expected." In this example template-based insight, there has been a sudden decrease in total revenue recently so a reason to potentially explain this drop may be useful or desired by a user. As such, the template-based insight may be used to explain that this drop is primarily due to the poor performance in a geographical location (e.g., a fact with a corresponding state of the United States of America).

A "natural language insight" refers to an insight with a number of facts generated by a language model in textual form based on a template-based insight (e.g., the language model paraphrases the template-based insight to output a natural language insight). The natural language insight can be generated from the template-based insight in order to change the text template of the template-based insight into natural language form. Any language model can be utilized to generate the natural language insight from the template-based insight.

A "hallucination" refers to cases where the language model generates output text unrelated to or unsupported by the input. In this regard, the output generated by the language model is considered false, as opposed to being based on the input data or context. A user relying on output text of a language model with a hallucination would be relying on incorrect data.

"Edit distance" refers to a measurement or extent of the similarity between two strings of characters or two integers. In embodiments, an edit distance is determined based on the minimum number of operations to change one string/integer to match the other string/integer. The operations can include inserting a character, deleting a character, or substituting a character for another character, etc.

Overview

Generative artificial intelligence (AI) technologies, including the most advanced large language models (LLM), such as ChatGPT™ from OpenAI® or Flan-T5™ from Google®, can produce content that is unfaithful-a problem known as hallucinations. A hallucination refers to cases where the language model generates output text unrelated to or unsupported by the input. In this regard, the output generated by the language model generates is false, as opposed to being based on the input data or context. A user relying on output text of a language model with a hallucination would be relying on incorrect data.

Accordingly, hallucination generation by language models is a significant problem in conventional implementations as hallucinations can occur at a nontrivial error rate, thereby decreasing the reliability of conventional language models. For example, if a language model generates a hallucination and the hallucination is presented to an entity or individual, the hallucination may cause the individual/entity to make an incorrect decision based on the hallucination. Alternatively, if a language model generates a hallucination and the hallucination is presented to an entity or individual, the hallucination may cause the individual/entity to cease implementation of the language model as the individual/entity would no longer trust the output of the language model. Further, unnecessary computing and network resources are utilized to manually identify hallucinations in conventional implementations. For example, computer input/output operations are unnecessarily increased each time a user must manually review whether a language model generated a hallucination. Under conventional implementation, when a language model generates an output, a user must manually verify the output generated by the language model to determine whether any hallucination is present. Each time a user manually checks each part of each statement generated by a language model, the user must manually execute multiple computer input/output operations causing the manual checking of output of a language model to be computationally expensive. Further, when a user manually checks each part of each statement generated by a language model with respect to data stored over a network, the processing of the manual checking decreases the throughput for a network, increases the network latency, and increases packet generation costs as the manual checking ties up network resources to access the corresponding data that the user seeks to manually verify.

As such, embodiments of the present disclosure are directed to hallucination prevention for insights in an efficient and effective manner in order to increase the reliability of insights generated by a language model. In this regard, embodiments described herein facilitate preventing the presentation of hallucinations in insights from language models. For example, insights can be generated regarding a business in order to facilitate understanding of the reasons behind various data events, predict future trends, and recommend possible actions for optimizing outcomes. Facts within each insight can be determined from stored data regarding the business and output into a text template to generate template-based insights. Thereafter, a language model is used to transform the template-based insights into natural language insights. The natural language insights are then checked for hallucinations by a hallucination gatekeeper engine. The hallucination gatekeeper engine checks the natural language insights to ensure that each fact of the template-based insight is included in the natural language insight, fix errors caused by a hallucination, and/or check for redundant or additional insights or facts in the natural language insight.

In operation, as described herein, a template-based insight is generated with one or more facts or data extrapolated from a dataset into a text template. For example, for the text template of "The lowest amount of {attribute_friendly_name} of {lowest_value_str} appeared on {lowest_date}, {percentage_less} less than the average of {average}," an example template-based insight can be generated as follows: "The lowest amount of visits was 2, which occurred on Jun. 2, 2020 and was 98% less than the average of 100."

A natural language insight is then generated by a language model from the template-based insight in order to refine the text template into natural language. For example, with respect to the example template-based insight mentioned above, an example natural language insight can be generated by a natural language model as follows: "At its lowest, Jun. 2, 2020 saw 2 visits—a 98% reduction from the average of 100."

A hallucination gatekeeper engine generally analyzes the natural language insight to identify any hallucination associated with the natural language insight. In one aspect, the hallucination gatekeeper engine searches the natural language insight for each insight or fact included in the template-based insight. In embodiments, the gatekeeper engine searches the natural language insight for each fact of the template-based insight in order of the length of the fact. For example, with respect to the example natural language insight mentioned above, the list of facts in order that the facts are mentioned in the template-based insight is "['visits,' '2', 'Jun. 2, 2020', '98%', '100']." However, in the example natural language insight, the first time the number "2" is mentioned is with respect to the fact "Jun. 2, 2020" and the wrong fact may be considered by the hallucination gatekeeper engine. Therefore, in embodiments, the gatekeeper engine searches the natural language insight for each fact of the template-based insight in order of the length of the fact in order to reduce the possibility of the wrong fact being considered by the hallucination gatekeeper engine in some instances. For example, the strings ordered by length can be ordered as "['Jun. 2, 2020', 'visits', '100', '98%', '2']" and the correct fact will be considered by the hallucination gatekeeper engine in this instance.

In embodiments, if more than a particular number of facts (e.g., one) is missing from the natural language insight, a new natural language insight is generated by the language model based on the template-based insight. For example, with respect to the example template-based insight discussed above, if the language model outputs an example natural language insight as follows: "At its lowest, Jun. 2, 2020 saw 3 visits—a 98% reduction from the average of 103," a new natural language insight would be generated by the language model based on the template-based insight (and subsequently checked by the hallucination gatekeeper engine) as the facts "2" and "100" are missing from the natural language insight.

If a particular number of facts (e.g., one) or less is missing from the natural language insight, the hallucination gatekeeper engine proceeds to the next hallucination check. For example, with respect to the example template-based insight discussed above, if the language model outputs an example natural language insight as follows: "At its lowest, Jun. 2, 2020 saw 2 visits—a 98% reduction from the average of 100" or "At its lowest, Jun. 2, 2020 saw 2 visits—a 98% reduction from the average of 103," the hallucination gatekeeper engine proceeds to the next hallucination check.

If a fact (e.g., only one fact) of the template-based insight is missing from the natural language insight, and a similar integer or string can be identified in the natural language insight, the fact can be corrected before proceeding to the next hallucination check by the hallucination gatekeeper engine. In this regard, an erroneous fact(s) output by the language model into the natural language insight can be corrected by the hallucination gatekeeper engine. In some embodiments, if only one fact of the template-based insight is missing from the natural language insight and the one fact is an integer, an integer can be identified in the natural language insight and replaced by the one fact if the edit distance is below a threshold (e.g., less than two operations) before proceeding to the next hallucination check by the hallucination gatekeeper engine. For example, with respect to the example template-based insight discussed above, if the language model outputs an example natural language insight as follows: "At its lowest, Jun. 2, 2020 saw 2 visits—a 98% reduction from the average of 103," the hallucination gatekeeper engine can identify the missing fact of "100" from the template-based insight and correct the integer "103" of the natural language insight to be "100" as it is an integer with an edit distance of less than two (e.g., in this example, the edit distance would be one as there is one operation to replace the "3" of "103" with a "0" in order to change "103" to "100").

In this embodiment, if the edit distance between the one fact of the template-based insight missing from the natural language insight is two or more, then a new natural language insight is generated by the language model based on the template-based insight (and subsequently checked by the hallucination gatekeeper engine). For example, with respect to the example template-based insight discussed above, if the language model outputs an example natural language insight as follows: "At its lowest, Jun. 2, 2020 saw 2 visits—a 98% reduction from the average of 203," the hallucination gatekeeper engine can cause a new natural language insight to be generated by the language model (e.g., in this example, the edit distance would be two as there is one operation to replace the "3" of "203" with a "0" and a second operation to replace the "2" of "203" with a "1" in order to change "203" to "100"). In other embodiments, the threshold edit distance to determine whether to fix the integer by the hallucination gatekeeper engine or generate a new natural language insight by the language model can be set to any threshold edit distance (e.g., greater than a threshold distance of two in the embodiment discussed above). Further, although these examples are directed to numerals and integers, as can be appreciated, implementations can be applied to facts in text or string format.

If no facts of the template-based insight are missing from the natural language insight (or in some embodiments, if the only missing fact is corrected by the hallucination gatekeeper engine), the hallucination gatekeeper engine checks the natural language insight for redundant facts. If there are redundant facts in the natural language insight, then a new natural language insight is generated by the language model based on the template-based insight (and subsequently checked by the hallucination gatekeeper engine). In some embodiments, the redundant facts can be removed so that the natural language insight can be displayed for presentation to the user. Otherwise, if there are no redundant facts in the natural language insight, then the natural language insight can be displayed for presentation to the user. In some embodiments, if no facts are missing from the natural language insight (e.g., from the example above, "At its lowest, Jun. 2, 2020 saw 2 visits—a 98% reduction from the average of 100", or in some embodiments, if the only missing fact is corrected by the hallucination gatekeeper engine), the natural language insight can be displayed to the user without proceeding to the redundancy check.

In embodiments, in order to check for redundant facts, if the number of facts of the natural language insight that include integers are greater than the number of facts of the template-based insight that include integers, then the hallucination gatekeeper engine causes the language model to generate a new natural language insight based on the template-based insight (and subsequently checked by the hallucination gatekeeper engine). For example, with respect to the example template-based insight discussed above, if the language model outputs an example natural language insight as follows: "At its lowest, Jun. 2, 2020 saw 2 visits—a 98% reduction from the average of 100, which was 2 visits," the hallucination gatekeeper engine can cause a new natural language insight to be generated by the language model because of the redundant integer "2" in the natural language insight. Otherwise, in embodiments, if the number of facts of the natural language insight that include integers are equal to the number of facts of the template-based insight that include integers, then the natural language insight can be displayed for presentation to the user. Further, although these examples are directed to numerals and integers, as can be appreciated, implementations can be applied to facts in text or string format.

In some embodiments, the hallucination gatekeeper engine only checks a set number of natural language insights generated from a single template-based insight. For example, if a natural language insight generated from a template-based insight fails the hallucination gatekeeper engine and a subsequent natural language insight generated from the template-based insight fails the hallucination gatekeeper engine again, the original template-based insight can be presented to the user instead of generating a new natural language insight to conserve computing resources. The hallucination gatekeeper engine may be set to check any number of natural language insights generated from a single template-based insight before providing the template-based insight instead of a natural language insight. In some embodiments, the template-based insight is provided for presentation to the user after three failures by the hallucination gatekeeper engine of natural language insights generated from a single template-based insight.

Advantageously, the reliability of language models can be enhanced using implementations described herein. In particular, in order to increase the reliability of insights generated by a language model, the hallucination gatekeeper engine checks the natural language insight to ensure that each fact of the template-based insight is located in the natural language insight, fix errors (e.g., minor numerical errors) of a hallucination of a language model, and/or check for redundant or additional facts in the natural language insight. In this regard, the reliability of natural language insights generated by the language model is increased as errors detected by the hallucination gatekeeper engine can result in insights being re-generated by the language model, thereby reducing the chance of a hallucination error errors being presented to a user in a natural language insight. Further, the utilization of unnecessary computing and network resources to manually identify hallucinations in conventional implementations can be reduced. Even further, in some embodiments, utilizing unnecessary computing resources can be reduced as a more simple operation that employs less computing resources than re-running a language model can be utilized in order to fix certain hallucination errors. In particular, the hallucination gatekeeper engine can fix errors through more simple operations than re-running the language model, which would otherwise utilize additional computing resources. For example, in some instances, running a language model to generate a natural language insight may take a non-negligible amount of time due to the amount of data being processed (e.g., even for a fine-tuned language model, which further conserves computing resources as discussed in further detail below, the language model can take ~0.5 seconds using an 8-core CPU in parallel processing) whereas running the hallucination gatekeeper engine to fix certain hallucination errors may take a negligible amount of time (e.g., the hallucination gatekeeper engine can fix errors through simple string matching operations for the short sentence/insight).

Overview of Exemplary Environments of Hallucination Prevention for Natural Language Insights Turning to the figures, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 8.

It should be understood that operating environment 100 shown in FIG. 1 is an example of one suitable operating environment. Among other components not shown, operating environment 100 includes a user device 102, application 110, network 104, template-based insights engine 106A, natural language insights engine 106B, and hallucination gatekeeper engine 108. Operating environment 100 also shows data source 112 that stores data, for example, to be used to generate template-based insights by the template-based insights engine 106A. Each of the components shown in FIG. 1 can be implemented via any type of computing device, such as one or more of computing device 800 described in connection to FIG. 8, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual or entity interested in generating insights regarding certain data. For example, in some implementations, such devices are the type of computing device described in relation to FIG. 8. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

Application 110 operating on user device 102 can generally be any application capable of facilitating the presentation of insights regarding certain data. For example, application 110 can be a part of analytics software (e.g., software that is capable of tracking, measuring, and analyzing data, such as website traffic, customer behavior, etc.) that is capable of generating and providing insights to entities or individuals regarding their data through application 110. In some implementations, the application 110 comprises a web application, which can run in a web browser, and could be hosted at least partially server-side (e.g., via template-based insights engine 106A, natural language insights engine 106B, and/or hallucination gatekeeper engine 108). In addition, or instead, the application 110 can comprise a dedicated application. In some cases, the application 110 is integrated into the operating system (e.g., as a service). As one specific example application, application 110 may be a visual design tool or other data analysis tool that provides various data and data visualizations as a part of analytics software. Such an application may be accessed via a mobile application, a web application, or the like.

User device 102 can be a client device on a client-side of operating environment 100, while template-based insights engine 106A, natural language insights engine 106B, and/or hallucination gatekeeper engine 108 can be on a server-side of operating environment 100. Template-based insights engine 106A, natural language insights engine 106B, and/or hallucination gatekeeper engine 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or hallucination gatekeeper engine 108 to remain as separate entities.

Application 110 operating on user device 102 can generally be any application capable of facilitating the exchange of information between the user device 102 and template-based insights engine 106A, natural language insights engine 106B, and/or hallucination gatekeeper engine 108 in generating insights regarding data. In some implementations, the application 110 comprises a web application, which can run in a web browser, and could be hosted at least partially on the server-side of environment 100. In addition, or instead, the application 110 can comprise a dedicated application. In some cases, the application 110 is integrated into the operating system (e.g., as a service). It is therefore contemplated herein that "application" be interpreted broadly.

In accordance with embodiments herein, the application 110 is prevented from presenting hallucinations generated by a language model in natural language insight in an efficient and effective manner in order to increase the reliability of natural language insights generated by a language model presented by application 110. As an example, application 110 can be a part of analytics software (e.g., software that is capable of tracking, measuring, and analyzing data, such as website traffic, customer behavior, etc.) that is capable of providing insights to entities or individuals regarding their data. The analytics software can include hallucination gatekeeper engine 108, template-based insights engine 106A, and/or natural language insights engine 106B. At a high level, the analytics software utilizes template-based insights engine 106A to generate template-based insights, natural language insights engine 106B to generate natural language insights from template-based insights, and hallucination gatekeeper engine 108 to prevent the presentation of hallucinations generated by the natural language insights engine 106B. In this regard, the analytics software can provide insights through application 110 regarding data of an entity or individual in natural language form that the end-user (e.g., the entity of individual receiving insights) of the software can rely upon.

In operation, as described herein, a template-based insight is generated by template-based insights engine 106A with one or more facts extrapolated from a dataset stored in data source 112 into a text template. For example, for the text template of "The lowest amount of {attribute_friendly_name} of {lowest_value_str} appeared on {lowest_date}, {percentage_less} less than the average of {average}," an example template-based insight can be generated as follows: "The lowest amount of visits was 2, which occurred on Jun. 2, 2020 and was 98% less than the average of 100." The data corresponding to each of the strings and the template itself can be stored and retrieve from data source 112.

A natural language insight is then generated by a language model of natural language insights engine 106B from the template-based insight in order to refine the text template into natural language. For example, with respect to the example template-based insight mentioned above, an example natural language insight can be generated by a natural language model of natural language insights engine 106B as follows: "At its lowest, Jun. 2, 2020 saw 2 visits—a 98% reduction from the average of 100."

A hallucination gatekeeper engine 108 generally analyzes the natural language insight to identify any hallucination associated with the natural language insight. In one aspect, the hallucination gatekeeper engine 108 searches the natural language insight for each insight or fact included in the template-based insight. In embodiments, the hallucination gatekeeper engine 108 searches the natural language insight for each fact of the template-based insight in order of the length of the fact. For example, with respect to the example natural language insight mentioned above, the list of facts in order that the facts are mentioned in the template-based insight is "['visits,' '2', 'Jun. 2, 2020', '98%', '100' ]." However, in the example natural language insight, the first time the number "2" is mentioned is with respect to the fact "Jun. 2, 2020" and, as such, the wrong fact may be considered by the hallucination gatekeeper engine 108. Therefore, in embodiments, the hallucination gatekeeper engine 108 searches the natural language insight for each fact of the template-based insight in order of the length of the fact in order to reduce the possibility of the wrong fact being considered by the hallucination gatekeeper engine in some instances. For example, the strings ordered by length can be ordered as "['Jun. 2, 2020', 'visits', '100', '98%', '2' ]" and the correct fact will be considered by the hallucination gatekeeper engine 108 in this instance.

In embodiments, if more than a particular number of facts (e.g., one) is missing from the natural language insight, hallucination gatekeeper engine 108 causes a new natural language insight to be generated by the language model of natural language insights engine 106B based on the template-based insight. For example, with respect to the example template-based insight discussed above, if the language model of natural language insights engine 106B outputs an example natural language insight as follows: "At its lowest, Jun. 2, 2020 saw 3 visits—a 98% reduction from the average of 103," a new natural language insight would be generated by the language model of natural language insights engine 106B based on the template-based insight (and subsequently checked by the hallucination gatekeeper engine) as the facts "2" and "100" are missing from the natural language insight.

If a particular number of facts (e.g., one) is missing from the natural language insight, the hallucination gatekeeper engine 108 proceeds to the next hallucination check. For example, with respect to the example template-based insight discussed above, if the language model of natural language insights engine 106B outputs an example natural language insight as follows: "At its lowest, Jun. 2, 2020 saw 2 visits—a 98% reduction from the average of 100" or "At its lowest, Jun. 2, 2020 saw 2 visits—a 98% reduction from the average of 103," the hallucination gatekeeper engine 108 proceeds to the next hallucination check.

If a fact (e.g., only one fact) of the template-based insight is missing from the natural language insight, and a similar integer or string can be identified in the natural language insight, the fact can be corrected by hallucination gatekeeper engine 108 before proceeding to the next hallucination check by the hallucination gatekeeper engine 108. In this regard, an erroneous fact(s) output by the language model into the natural language insight can be corrected by the hallucination gatekeeper engine. In some embodiments, if only one fact of the template-based insight is missing from the natural language insight and the one fact is an integer, hallucination gatekeeper engine 108 can identify an integer in the natural language insight and replace the integer with the one fact if the edit distance is below a threshold (e.g., less than two operations) before proceeding to the next hallucination check by the hallucination gatekeeper engine 108. For example, with respect to the example template-based insight discussed above, if the language model of natural language insights engine 106B outputs an example natural language insight as follows: "At its lowest, Jun. 2, 2020 saw 2 visits—a 98% reduction from the average of 103," the hallucination gatekeeper engine 108 can identify the missing fact of "100" from the template-based insight and correct the integer "103" of the natural language insight to be "100" as it is an integer with an edit distance of less than two (e.g., in this example, the edit distance would be one as there is one operation to replace the "3" of "103" with a "0" in order to change "103" to "100").

In this embodiment, if the edit distance between the one fact of the template-based insight missing from the natural language insight is two or more, then hallucination gatekeeper engine 108 can cause a new natural language to be generated by the language model of natural language insights engine 106B based on the template-based insight (and subsequently checked by the hallucination gatekeeper engine 108). For example, with respect to the example template-based insight discussed above, if the language model of natural language insights engine 106B outputs an example natural language insight as follows: "At its lowest, Jun. 2, 2020 saw 2 visits—a 98% reduction from the average of 203," the hallucination gatekeeper engine 108 can cause a new natural language insight to be generated by the language model of natural language insights engine 106B (e.g., in this example, the edit distance would be two as there is one operation to replace the "3" of "203" with a "0" and a second operation to replace the "2" of "203" with a "1" in order to change "203" to "100"). In other embodiments, the threshold edit distance to determine whether to fix the integer by the hallucination gatekeeper engine 108 or cause a new natural language insight to be generated by the language model of natural language insights engine 106B can be set to any threshold edit distance (e.g., greater than a threshold distance of two in the embodiment discussed above). Further, although these examples are directed to numerals and integers, as can be appreciated, implementations can be applied to facts in text or string format.

If no facts of the template-based insight are missing from the natural language insight (or in some embodiments, if the only missing fact is corrected by the hallucination gatekeeper engine), the hallucination gatekeeper engine 108 checks the natural language insight for redundant facts. If there are redundant facts in the natural language insight, then hallucination gatekeeper engine 108 causes a new natural language insight to be generated by the language model of natural language insights engine 106B based on the template-based insight (and subsequently checked by the hallucination gatekeeper engine 108). In some embodiments, the redundant facts can be removed so that the natural language insight can be displayed for presentation to the user. Otherwise, if there are no redundant facts in the natural language insight, then the natural language insight can be displayed for presentation to the user through a display screen via application 110 of user device 102. In some embodiments, if no facts are missing from the natural language insight (e.g., from the example above, "At its lowest, Jun. 2, 2020 saw 2 visits—a 98% reduction from the average of 100", or in some embodiments, if the only missing fact is corrected by the hallucination gatekeeper engine), the natural language insight can be displayed to the user without proceeding to the redundancy check.

In embodiments, in order to check for redundant facts, if the number of facts of the natural language insight that include integers are greater than the number of facts of the template-based insight that include integers, then the hallucination gatekeeper engine 108 causes the language model of natural language insights engine 106B to generate a new natural language insight based on the template-based insight (and subsequently checked by the hallucination gatekeeper engine 108). For example, with respect to the example template-based insight discussed above, if the language model of natural language insights engine 106B outputs an example natural language insight as follows: "At its lowest, Jun. 2, 2020 saw 2 visits—a 98% reduction from the average of 100, which was 2 visits," the hallucination gatekeeper engine 108 can cause a new natural language insight to be generated by the language model of natural language insights engine 106B because of the redundant integer "2" in the natural language insight. Otherwise, in embodiments, if the number of facts of the natural language insight that include integers are equal to the number of facts of the template-based insight that include integers, then the natural language insight can be displayed for presentation to the user through a display screen via application 110 of user device 102. Further, although these examples are directed to numerals and integers, as can be appreciated, implementations can be applied to facts in text or string format.

In some embodiments, the hallucination gatekeeper engine 108 only checks a set number of natural language insights generated from a single template-based insight. For example, if a natural language insight generated from a template-based insight fails the hallucination gatekeeper engine 108 and a subsequent natural language insight generated from the template-based insight fails the hallucination gatekeeper engine 108 again, the original template-based insight can be presented to the user instead of generating a new natural language insight to conserve computing resources. The hallucination gatekeeper engine may be set to check any number of natural language insights generated from a single template-based insight before providing the template-based insight instead of a natural language insight. In some embodiments, the template-based insight is provided for presentation to the user through a display screen via application 110 of user device 102 after three failures by the hallucination gatekeeper engine 108 of natural language insights generated from a single template-based insight by natural language insights engine 106B.

At a high level, hallucination gatekeeper engine 108 performs various functionality to facilitate efficient and effective hallucination prevention for natural language insights in order to increase the reliability of insights generated by a language model. The hallucination gatekeeper engine 108, template-based insights engine 106A, and/or natural language insights engine 106B can communicate with application 110 in order for application 110 to display the natural language insights and/or template-based insights via a display screen of the user device 102.

In this regard, hallucination gatekeeper engine 108 can receive data regarding template-based insights from template-based insights engine 106A and natural language insights from natural language insights engine 106B. The hallucination gatekeeper engine 108 checks the natural language insight to ensure that each fact of the template-based insight is located in the natural language insight, fix errors (e.g., minor numerical errors) caused by a hallucination, and/or check for redundant or additional facts in the natural language insight. Further, hallucination gatekeeper engine 108 can determine whether to cause display of natural language insight from natural language insights engine 106B by application 110 of the user device 102, cause natural language insights engine 106B to generate a new natural language insight based on the template-based insight, and/or cause display of the template-based insight from template-based insights engine 106A by application 110 of the user device 102. Hallucination gatekeeper engine 108, template-based insights engine 106A, and natural language insights engine 106B can each be or include a server, including one or more processors, and one or more computer-readable media. The computer-readable media includes computer-readable instructions executable by the one or more processors. The instructions can optionally implement one or more components of hallucination gatekeeper engine 108, template-based insights engine 106A, and natural language insights engine 106B, described in additional detail below with respect to natural language insights manager 202 of FIG. 2.

For cloud-based implementations, the instructions on hallucination gatekeeper engine 108, template-based insights engine 106A, and natural language insights engine 106B can implement one or more components, and application 110 can be utilized by a user to interface with the functionality implemented on hallucination gatekeeper engine 108, template-based insights engine 106A, and natural language insights engine 106B. In some cases, application 110 comprises a web browser. In other cases, hallucination gatekeeper engine 108, template-based insights engine 106A, and/or natural language insights engine 106B may not be required. For example, the components of hallucination gatekeeper engine 108, template-based insights engine 106A, and/or natural language insights engine 106B may be implemented completely on a user device, such as user device 102. In this case, hallucination gatekeeper engine 108, template-based insights engine 106A, and/or natural language insights engine 106B may be embodied at least partially by the instructions corresponding to application 110.

Thus, it should be appreciated that hallucination gatekeeper engine 108, template-based insights engine 106A, and natural language insights engine 106B may be provided via multiple devices arranged in a distributed environment that collectively provide the functionality described herein. Additionally, other components not shown may also be included within the distributed environment. In addition, or instead, hallucination gatekeeper engine 108, template-based insights engine 106A, and/or natural language insights engine 106B can be integrated, at least partially, into a user device, such as user device 102. Furthermore, hallucination gatekeeper engine 108, template-based insights engine 106A, and/or natural language insights engine 106B may at least partially be embodied as a cloud computing service. For example, an analytics service (e.g., a service that is capable of tracking, measuring, and analyzing data, such as website traffic, customer behavior, etc.) that is capable of providing insights to entities or individuals regarding their data can include hallucination gatekeeper engine 108, template-based insights engine 106A, and/or natural language insights engine 106B. At a high level, the analytics service utilizes template-based insights engine 106A to generate template-based insights, natural language insights engine 106B to generate natural language insights from template-based insights, and hallucination gatekeeper engine 108 to prevent the presentation of hallucinations generated by the natural language insights engine 106B. In this regard, the analytics service can provide insights regarding data of an entity or individual in natural language form that the end-user (e.g., the entity of individual receiving insights) of the service can rely upon.

Figure 2:
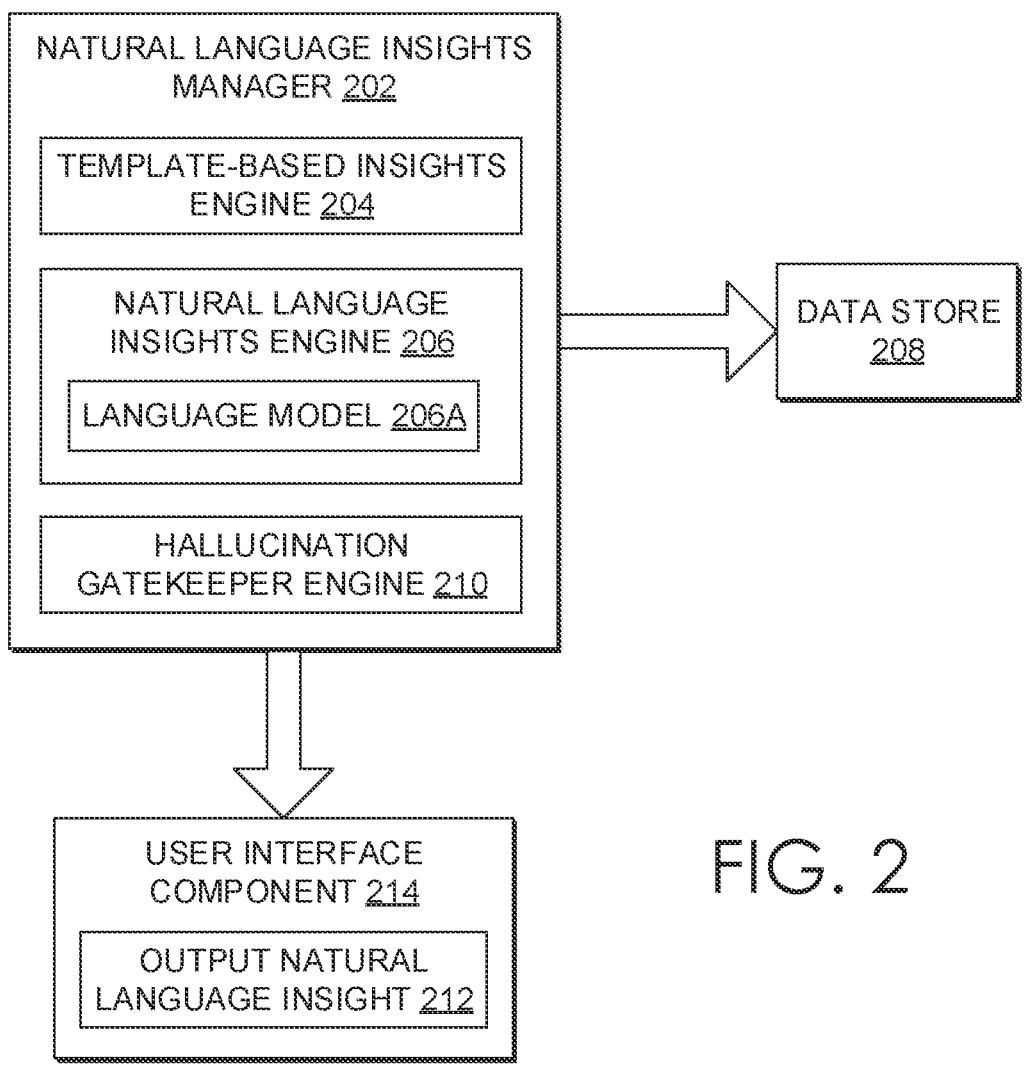
FIG. 2 depicts an example configuration of an operating environment in which some implementations of the present disclosure can be employed, in accordance with various embodiments of the present disclosure.

Referring to FIG. 2, aspects of an illustrative natural language insights management system are shown, in accordance with various embodiments of the present disclosure. At a high level, the natural language insights management system can facilitate efficient and effective hallucination prevention for natural language insights in order to increase the reliability of insights generated by a language model.

As shown in FIG. 2, natural language insights manager 202 includes a template-based insights engine 204, a natural language insights engine 206, and a hallucination gatekeeper engine 210. Natural language insights manager 202 provides output natural language insight 212 for presentation through user interface component 214. The natural language insights manager 202 can communicate with the data store 208. The data store 208 is configured to store various types of information accessible by natural language insights manager 202, or other server or component. As an example, natural language insights manager can be a part of analytics software (e.g., software that is capable of tracking, measuring, and analyzing data, such as website traffic, customer behavior, etc.) that is capable of providing insights to entities or individuals regarding their data and can include hallucination gatekeeper engine 210, template-based insights engine 204, and/or natural language insights engine 206. At a high level, the analytics software utilizes template-based insights engine 204 to generate template-based insights, natural language insights engine 206 to generate natural language insights from template-based insights, and hallucination gatekeeper engine 210 to prevent the presentation of hallucinations generated by the natural language insights engine 206. In this regard, the analytics software, through natural language insights manager 202, can provide insights regarding data of an entity or individual in natural language form that the end-user (e.g., the entity of individual receiving insights) of the software can rely upon. The foregoing components of natural language insights manager 202 can be implemented, for example, in operating environment 100 of FIG. 1. In particular, those components may be integrated into any suitable combination of user devices 102, template-based insights engine 106A, natural language insights engine 106B, and/or hallucination gatekeeper engine 108. In this regard, user interface component 214 can be any type of user interface (e.g., a display screen/graphical user interface provided via the application 110 on user device 102).

In embodiments, data sources, user devices (such as user device 102 of FIG. 1 and user interface component 214), and natural language insights manager 202 can provide data to the data store 208 for storage, which may be retrieved or referenced by any such component. As such, the data store 208 can store computer instructions (e.g., software program instructions, routines, or services), data and/or models used in embodiments described herein, such as data for generating insights, templates for generating template-based insights, natural language models for generating natural language insights from the template-based insights, operations for preventing the presentation of hallucinations, and/ or the like. In some implementations, data store 208 can store information or data received or generated via the various components of natural language insights manager 202 and provides the various components with access to that information or data, as needed. The information in data store 208 may be distributed in any suitable manner across one or more data stores for storage (which may be hosted externally).

The template-based insights engine 204 is generally configured to generate template-based insights with one or more facts extrapolated from a dataset into a text template. In embodiments, template-based insights engine 204 can include rules, conditions, associations, models, algorithms, or the like to generate template-based insights with one or more facts extrapolated from a dataset into a text template. Template-based insights engine 204 may take on different forms depending on the mechanism used to generate template-based insights with one or more facts extrapolated from a dataset into a text template. For example, template-based insights engine 204 may comprise natural language processing techniques, a statistical model, fuzzy logic, neural network, finite state machine, support vector machine, logistic regression, clustering, or machine-learning techniques, similar statistical classification processes, or combinations of these to generate template-based insights with one or more facts extrapolated from a dataset into a text template.

In embodiments, a template-based insight is generated by template-based insights engine 204 with one or more facts extrapolated from a dataset stored in data store 208 into a text template. For example, for the text template of "The lowest amount of {attribute_friendly_name} of {lowest_value_str} appeared on {lowest_date}, {percentage_less} less than the average of {average}," an example template-based insight can be generated as follows: "The lowest amount of visits was 2, which occurred on Jun. 2, 2020 and was 98% less than the average of 100." The data corresponding to each of the strings and the template itself can be stored and retrieve from data store 208. A template for use in generating a template-based insight can be selected in any number of ways. For example, a dataset stored in data store 208 may be identified (e.g., automatically by analytics software or selected by an end-user of an application) and events within the dataset can be identified (e.g., cyclic patterns, changes, extremum data (minimum, maximum), predicted/forecasted data, reasoning behind events, etc.). A text template for the corresponding event can be identified. For example, if the period of January 1 to February 1 is identified as having the greatest revenue of $10 million then an appropriate text template can be identified, such as "The period from _____ to _____ had the greatest revenue of _____." In such a case, the identified facts can be inserted into the template to generate the template-based insight of "The period from January 1 to February 1 had the greatest revenue of $10 million." In other embodiments, a template can be identified first and events corresponding to the textual template can be identified from the dataset based on the template. In some embodiments, the template-based insights engine 204 (or analytics software) automatically identifies the template and/or dataset to generate the template-based insight. In other embodiments, the user selects the template and/or dataset for the template-based insights engine 204 (or analytics software) to generate the template-based insight.

The natural language insights engine 206 is generally configured to generate natural language insights from template-based insights through language model 206A. Natural language insights engine 206 can include rules, conditions, associations, models, algorithms, or the like to generate natural language insights from template-based insights through language model 206A. Natural language insights engine 206 may take on different forms depending on the mechanism used to generate natural language insights from template-based insights through language model 206A. For example, natural language insights engine 206/language model 206A may comprise a natural language processing techniques, statistical model, fuzzy logic, neural network, finite state machine, support vector machine, logistic regression, clustering, or machine-learning techniques, similar statistical classification processes, or combinations of these to generate natural language insights from template-based insights through language model 206A.

Natural language insights engine 206 includes a language model 206A trained to generate natural language insights from template-based insights. In embodiments, language model 206A is a refined language model—an example of which is provided and discussed below with respect to FIG. 3. Generally, and at a high-level, natural language insights engine 206 receives a template-based insight from template-based insights engine 204 and generates a natural language insight based on the template-based insight. The natural language insight is then checked by hallucination gatekeeper engine 210 to prevent the presentation of hallucination in the natural language insight. After the natural language insight generated by natural language insights engine 206 passes hallucination gatekeeper engine 210, the natural language insight can be displayed to the user. For example, after passing hallucination gatekeeper engine 210, natural language insights engine 206 provides output natural language insight 212 to user interface component 214.

In embodiments, a natural language insight is generated by language model 206A of natural language insights engine 206 from the template-based insight in order to refine the text template into natural language. For example, with respect to the example template-based insight mentioned above, an example natural language insight can be generated by a language model 206A of natural language insights engine 206 as follows: "At its lowest, Jun. 2, 2020 saw 2 visits—a 98% reduction from the average of 100." Examples of the language model 206A are discussed in further detail below with respect to FIG. 3. Generally, language model 206A can be any type of language model trained for natural language processing, such as transformer models, generative language models, etc.

The hallucination gatekeeper engine 210 is generally configured to check the natural language insight generated by the natural language insights engine 206 for hallucinations. In embodiments, hallucination gatekeeper engine 210 can include rules, conditions, associations, models, algorithms, or the like to check the natural language insight generated by the natural language insights engine 206 for hallucinations. At a high level, a hallucination gatekeeper engine checks the natural language insight to ensure that each insight fact of the template-based insight is included in the natural language insight, fix errors (e.g., minor numerical errors) caused by a hallucination, and/or check for redundant or additional numerical facts in the natural language insight.

In embodiments, hallucination gatekeeper engine 210 generally analyzes the natural language insight to identify any hallucination associated with the natural language insight. In one aspect, the hallucination gatekeeper engine 210 searches the natural language insight for each insight or fact included in the template-based insight. In embodiments, the hallucination gatekeeper engine 210 searches the natural language insight for each fact of the template-based insight in order of the length of the fact. For example, with respect to the example natural language insight mentioned above, the list of facts in order that the facts are mentioned in the template-based insight is "['visits,' '2', 'Jun. 2, 2020', '98%', '100' ]." However, in the example natural language insight, the first time the number "2" is mentioned is with respect to the fact "Jun. 2, 2020" and, as such, the wrong fact may be considered by the hallucination gatekeeper engine 210. Therefore, in embodiments, the hallucination gatekeeper engine 210 searches the natural language insight for each fact of the template-based insight in order of the length of the fact to reduce the possibility of the wrong fact being considered by the hallucination gatekeeper engine 210 in some instances. For example, the strings ordered by length can be ordered as "['Jun. 2, 2020', 'visits', '100', '98%', '2' ]" and the correct fact will be considered by the hallucination gatekeeper engine in this instance.

In embodiments, if more than a particular number of facts (e.g., one) is missing from the natural language insight, hallucination gatekeeper engine 210 causes a new natural language insight to be generated by the language model 206A of natural language insights engine 206 based on the template-based insight. For example, with respect to the example template-based insight discussed above, if the language model 206A of natural language insights engine 206 outputs an example natural language insight as follows: "At its lowest, Jun. 2, 2020 saw 3 visits—a 98% reduction from the average of 103," a new natural language insight would be generated by the language model 206A of natural language insights engine 206 based on the template-based insight (and subsequently checked by the hallucination gatekeeper engine) as the facts "2" and "100" are missing from the natural language insight.

If a particular number of facts (e.g., one) is missing from the natural language insight, the hallucination gatekeeper engine 210 proceeds to the next hallucination check. For example, with respect to the example template-based insight discussed above, if the language model 206A of natural language insights engine 206 outputs an example natural language insight as follows: "At its lowest, Jun. 2, 2020 saw 2 visits—a 98% reduction from the average of 100" or "At its lowest, Jun. 2, 2020 saw 2 visits—a 98% reduction from the average of 103," the hallucination gatekeeper engine 210 proceeds to the next hallucination check.

In some cases, if a fact (e.g., only one fact) of the template-based insight is missing from the natural language insight, and a similar integer or string can be identified in the natural language insight, the fact can be corrected by hallucination gatekeeper engine 210 before proceeding to the next hallucination check by the hallucination gatekeeper engine 210. In this regard, an erroneous fact(s) output by the language model into the natural language insight can be corrected by the hallucination gatekeeper engine. In some embodiments, if only one fact of the template-based insight is missing from the natural language insight and the one fact is an integer, hallucination gatekeeper engine 210 can identify an integer in the natural language insight and replace the integer with the one fact if the edit distance is below a threshold (e.g., less than two operations) before proceeding to the next hallucination check by the hallucination gatekeeper engine 210. For example, with respect to the example template-based insight discussed above, if the language model 206A of natural language insights engine 206 outputs an example natural language insight as follows: "At its lowest, Jun. 2, 2020 saw 2 visits—a 98% reduction from the average of 103," the hallucination gatekeeper engine 210 can identify the missing fact of "100" from the template-based insight and correct the integer "103" of the natural language insight to be "100" as it is an integer with an edit distance of less than two (e.g., in this example, the edit distance would be one as there is one operation to replace the "3" of "103" with a "0" in order to change "103" to "100").

In this embodiment, if the edit distance between the one fact of the template-based insight missing from the natural language insight is two or more, then hallucination gatekeeper engine 210 can cause a new natural language to be generated by the language model 206A of natural language insights engine 206 based on the template-based insight (and subsequently checked by the hallucination gatekeeper engine 210). For example, with respect to the example template-based insight discussed above, if the language model 206A of natural language insights engine 206 outputs an example natural language insight as follows: "At its lowest, Jun. 2, 2020 saw 2 visits—a 98% reduction from the average of 203," the hallucination gatekeeper engine 210 can cause a new natural language insight to be generated by the language model 206A of natural language insights engine 206 (e.g., in this example, the edit distance would be two as there is one operation to replace the "3" of "203" with a "0" and a second operation to replace the "2" of "203" with a "1" in order to change "203" to "100"). In other embodiments, the threshold edit distance to determine whether to fix the integer by the hallucination gatekeeper engine 210 or cause a new natural language insight to be generated by the language model 206A of natural language insights engine 206 can be set to any threshold edit distance (e.g., greater than a threshold distance of two in the embodiment discussed above). Further, although these examples are directed to numerals and integers, as can be appreciated, implementations can be applied to facts in text or string format.

If no facts of the template-based insight are missing from the natural language insight (or in some embodiments, if the only missing fact is corrected by the hallucination gatekeeper engine), the hallucination gatekeeper engine 210 checks the natural language insight for redundant facts. If there are redundant facts in the natural language insight, then hallucination gatekeeper engine 210 causes a new natural language insight to be generated by the language model 206A of natural language insights engine 206 based on the template-based insight (and subsequently checked by the hallucination gatekeeper engine 210). In some embodiments, the redundant facts can be removed so that the natural language insight can be displayed for presentation to the user. Otherwise, if there are no redundant facts in the natural language insight, then the natural language insight can be displayed for presentation to the user (e.g., output natural language insight 212 displayed in user interface component 214). In some embodiments, if no facts are missing from the natural language insight (e.g., from the example above, "At its lowest, Jun. 2, 2020 saw 2 visits—a 98% reduction from the average of 100", or in some embodiments, if the only missing fact is corrected by the hallucination gatekeeper engine), the natural language insight can be displayed to the user without proceeding to the redundancy check.

In embodiments, in order to check for redundant facts, if the number of facts of the natural language insight that include integers are greater than the number of facts of the template-based insight that include integers, then the hallucination gatekeeper engine 210 causes the language model 206A of natural language insights engine 206 to generate a new natural language insight based on the template-based insight (and subsequently checked by the hallucination gatekeeper engine 210). For example, with respect to the example template-based insight discussed above, if the language model 206A of natural language insights engine 206 outputs an example natural language insight as follows: "At its lowest, Jun. 2, 2020 saw 2 visits—a 98% reduction from the average of 100, which was 2 visits," the hallucination gatekeeper engine 210 can cause a new natural language insight to be generated by the language model 206A of natural language insights engine 206 because of the redundant integer "2" in the natural language insight. Otherwise, in embodiments, if the number of facts of the natural language insight that include integers are equal to the number of facts of the template-based insight that include integers, then the natural language insight can be displayed for presentation to the user (e.g., output natural language insight 212 displayed in user interface component 214). Further, although these examples are directed to numerals and integers, as can be appreciated, implementations can be applied to facts in text or string format.

In some embodiments, the hallucination gatekeeper engine 210 only checks a set number of natural language insights generated from a single template-based insight. For example, if a natural language insight generated from a template-based insight fails the hallucination gatekeeper engine 210 and a subsequent natural language insight generated from the template-based insight fails the hallucination gatekeeper engine 210 again, the original template-based insight can be presented to the user instead of generating a new natural language insight to conserve computing resources (e.g., an output template-based insight would be displayed in user interface component 214 instead of output natural language insight 212). The hallucination gatekeeper engine 210 may be set to check any number of natural language insights generated from a single template-based insight before providing the template-based insight instead of a natural language insight. In some embodiments, the template-based insight is provided for presentation to the user (e.g., an output template-based insight would be displayed in user interface component 214 instead of output natural language insight 212) after three failures by the hallucination gatekeeper engine 210 of natural language insights generated from a single template-based insight by natural language insights engine 206.

Figure 3:
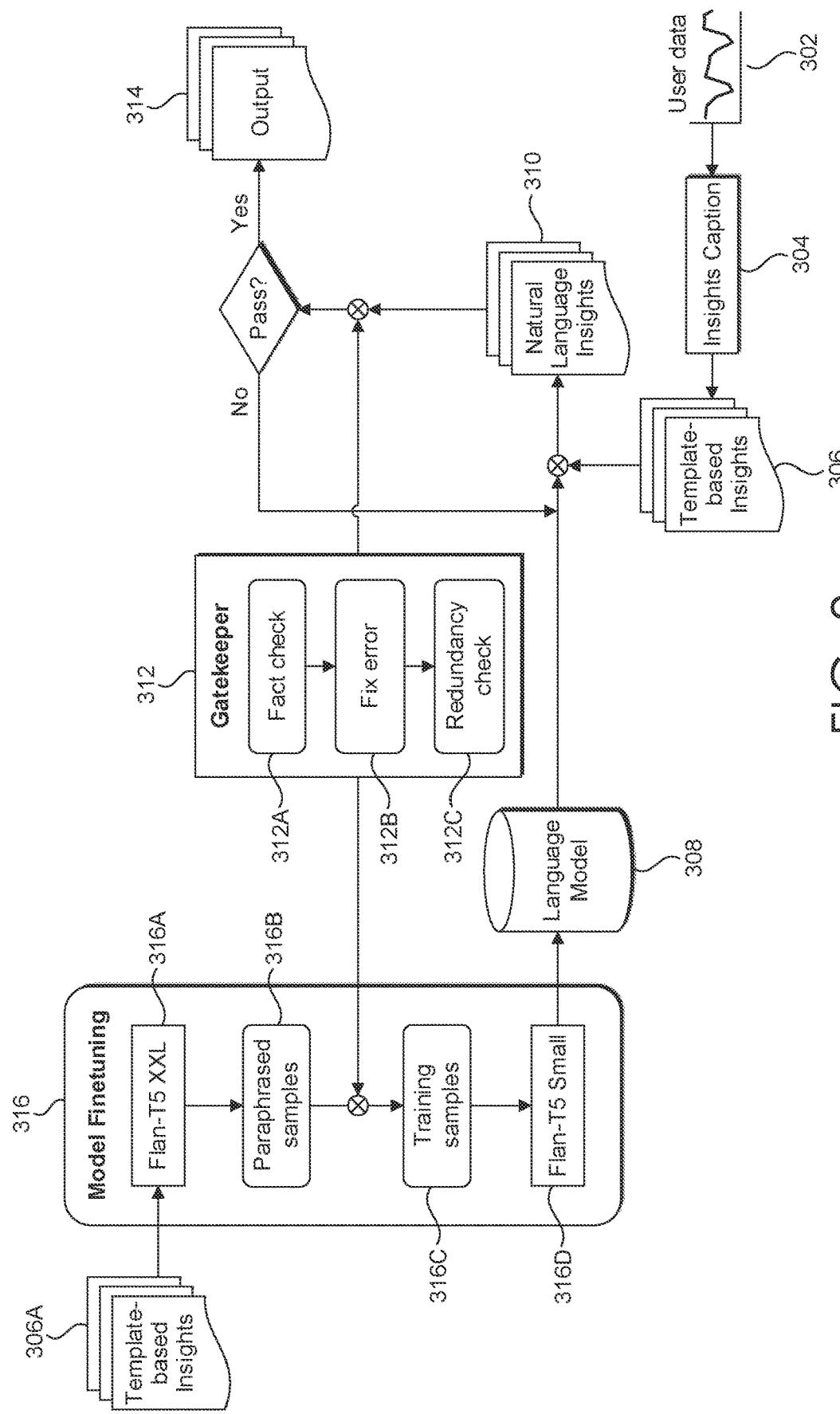
FIG. 3 provides an example diagram of hallucination prevention for natural language insights, in accordance with embodiments of the present disclosure.

FIG. 3 provides an example diagram of hallucination prevention for natural language insights, in accordance with embodiments of the present disclosure. At a high level, a hallucination gatekeeper engine checks the natural language insight to ensure that each fact of the template-based insight is located in the natural language insight, fixes errors caused by a hallucination, and/or checks for redundant or additional facts in the natural language insight.

As shown in FIG. 3, user data 302 and insights caption 304 (e.g., a text template) are used to generate template-based insight 306 (e.g., through a template-based insights engine 204 in FIG. 2). Template-based insights 306 are input into language model 308 (e.g., language model 206A of natural language insights engine 206 in FIG. 2) in order to generate natural language insights from the template-based insights 306. Natural language insights 310 are checked by gatekeeper 312 (e.g., hallucination gatekeeper engine 210 in FIG. 2). As shown, gatekeeper 312 can include a fact check 312A, fix error 312B, and a redundancy check 312C. If natural language insights 310 pass gatekeeper 312, the natural language are output as output 314, so the natural language insights can be displayed to the user (e.g., output natural language insight 212 displayed in user interface component 214 in FIG. 2).

For example, insights can be generated regarding a business in order to facilitate understanding of the reasons behind various data events, predict future trends, and recommend possible actions for optimizing outcomes. Insights (e.g., facts) can be determined from user data 302 regarding the business and output into a text template of an insights caption 304 to generate template-based insights 306. An example template of an insights caption 304 can be provided as follows: The lowest amount of {attribute_friendly_name} of {lowest_value_str} appeared on {lowest_date}, {percentage_less} less than the average of {average}.

A language model 308 can be utilized to transform the template-based insights 306 into natural language insights 310. The language model can be fine-tuned by distilling a large language model to a smaller language model (discussed below with respect to model fine-tuning 316).

The natural language insights 310 is then checked for hallucinations by a hallucination gatekeeper engine, gatekeeper 312. Gatekeeper 312 checks the natural language insight to ensure that each insight fact of the template-based insight is located in the natural language insight (e.g. fact check 312A), fix errors caused by a hallucination (e.g. fix error 312B), and/or check for redundant or additional numerical facts in the natural language insight (e.g. redundancy check 312C).

In an exemplary embodiment, in order for gatekeeper 312 to check the natural language insight for hallucinations, for each incoming data, a template-based insight $\mathcal{T}$ (e.g., template-based insights 306) is created, which is fed to the pre-trained language model $\mathcal{M}$ (e.g. model 308), thus generating the natural language insight $\mathcal{C}$ (e.g., natural language insights 310). In this regards, gatekeeper 312 will check if each generated natural language insight $\mathcal{C}$ is faithful to the original template-based insight. If $\mathcal{C}$ passes the gatekeeper 312, $\mathcal{C}$ can be presented to a user as output 314 (and may include post-processing for purposes to display $\mathcal{C}$). Otherwise, if $\mathcal{C}$ does not pass the gatekeeper 312, $\mathcal{T}$ is fed to $\mathcal{M}$ to generate a new $\mathcal{C}$, and run through gatekeeper 312 again.

Each time a new $\mathcal{C}$ is generated the error is reduced as each inference is independent, and the outputs from different runs are unrelated and likely different. For example, for a model with an error rate (e.g., chance of giving flawed results) of ~5%, the probability that two runs are both flawed is 0.05×0.05=0.0025 or 0.25%, and the probability that three runs are both flawed is 0.05×0.05×0.05=0.000125 or 0.0125%. Therefore, the amount of times the loop (e.g., each time a natural language insight is generated based on a template-based insight and checked by gatekeeper 312) is run can be limited. For example, if the loop limit is set to 3 maximum runs for the loop and none of the generated natural language from the single template-based insight passes the gatekeeper 312, the original $\mathcal{T}$ (e.g., template-based insights 306) can be provided for display as output 314. In this regard, occasionally returning the original $\mathcal{T}$ would not affect the overall sense of language diversity as most insights presented as output 314 to the user would be natural language insights.

In the embodiment shown in FIG. 3, gatekeeper 312 has three components: (1) gatekeeper 312 first verifies if all facts (critical information) are preserved (e.g. fact check 312A); (2) gatekeeper 312 can fix errors created by hallucination (e.g. fix error 312B), thus the language model does not need to be re-run because running the language model is much more computationally expensive; and (3) gatekeeper 312 checks if $\mathcal{C}$ contains redundancies (e.g. redundancy check 312C). In this regard, the running time of gatekeeper 312 is negligible as it contains only simple string operations on short sentences (e.g., insights), thus conserving computing resources.

In one embodiment implementing gatekeeper 312, for ($\mathcal{T}$, $\mathcal{C}$), where $\mathcal{T}$ is the original template-based insight (e.g., template-based insight 306) and $\mathcal{C}$ is the natural language insight (e.g., natural language insight 310), a copy of $\mathcal{C}$ is made and named $\mathcal{B}$. An empty list: $\mathcal{L}$=[ ] is also created, which can store the list of missing facts in $\mathcal{C}$.

For an initial fact check (e.g. fact check 312A), gatekeeper 312 checks if C contains all important facts (e.g., critical information) in $\mathcal{T}$. For example, the following template is provided: "The lowest amount of {attribute_friendly_name} of {lowest_value_str} appeared on {lowest_date}, {percentage_less} less than the average of {average}." In this example, the strings enclosed by brackets, such as {lowest_date} and {percentage_less} are all facts as the strings enclosed by brackets represent the numbers that users are interested and the string {attribute_friendly_name} is the name of the attribute (e.g., the attribute may be website visits, revenue, or any attribute to which the data/insights pertain). An example template-based insight (e.g., template-based insight 306) is generated based on the example template as follows: "The lowest amount of visits was 2, which occurred on Jun. 2, 2020 and was 98% less than the average of 100."

For performing a fact-check (e.g. fact check 312A), in some embodiments, a language model (e.g., language model 308) may generate a hallucination with missing information (e.g., missing insights/facts from the template-based insight). Examples of hallucinations with missing information are provided as follows:

Hallucination with Missing Information Example 1
  Template-based insight: "During this period, the amount of totalcalls_ad peaked 9,932.04 on 5:00 PM. The highest amount of totalcalls_ad was 60% more than the average."
  Natural language insight: "The highest amount of totalcalls_ad was 60% more than the average."
  Explanation: In this example, "9,932.04 on 5:00 PM" is missing from the natural language insight.

Hallucination with Missing Information Example 2
  Template-based insight: "5 anomalous amounts of totalcalls_video were observed on 17:00, 17:00, 17:00, 17:00, and 17:00, where the values deviated by 33% from the average of this period."
  Natural language insight: "The anomalous amounts of totalcalls_video were observed on 17:00, 17:00, 17:00, and 17:00, where the values deviated by 33% from the average of this period."
  Explanation: In this example, one out of the five times "17:00" is mentioned in the template-based insight is missing from the natural language insight.

In the embodiment implementing gatekeeper 312, in order to perform the initial fact check (e.g. fact check 312A), gatekeeper 312 can perform the following operations:
  (1) identifies all the facts in $\mathcal{T}$;
  (2) puts the identified facts in a list: f=[f1, f2, ..., fn], ordered by the length of each fact, from long to short;
  (3) For i=1, ... n, search for $f_i$ in $\mathcal{B}$: (i) If $f_i$ is missing, add $f_i$ to $\mathcal{L}$; (ii) If the size of $\mathcal{L}$ greater than 1, return failure for Gatekeeper; and (iii) otherwise remove the $1^{st}$ occurrence of $f_i$ from $\mathcal{B}$; and
  (4) Return success.

$\mathcal{L}$ represents the list of missing facts. If two or more facts are missing, a failure is reported in order to re-generate the natural language insight from the template-based insight. Otherwise, gatekeeper 312 moves to the next step with the updated $\mathcal{B}$.

In some embodiments, if the list of facts is not ordered based on length, some faithful paraphrasing by language model 308 in natural language insights results (e.g., natural language insights 310) will fail gatekeeper 312. For example, the original template-based insight provides as follows: "The lowest amount of visits was 2, which occurred on Jun. 2, 2020 and was 98% less than the average of 100." The natural language insight provides as follows: At its lowest, Jun. 2, 2020 saw 2 visits—a 98% reduction from the average of 100." Thus, the list of facts, not ordered by length, becomes: "['visits,' '2', 'Jun. 2, 2020', '98%', '100']." If the facts are not ordered by length, when '2' is found and removed from $\mathcal{B}$, it becomes: "At its lowest, Jun. nd, 2020 saw 2 visits—a 98% reduction from the average of 100." Thus, in this case, when gatekeeper 312 searches for 'Jun. 2, 2020,' the natural language insight will fail gatekeeper 312 because '2' is already removed. Thus, in some cases, the list of facts from the template-based insight must be ordered by length when searching the natural language insights.

For fixing errors (e.g. fix error 312B), in some embodiments, a language model (e.g., language model 308) may generate a hallucination in the natural language insight that modifies one or more numerical values of facts of the template-based insight. Examples of hallucinations with a change in numerical information are provided as follows:

Hallucination with a Change in Numerical Information Example 1

Template-based insight: "During this period, the amount of peakcalls_ad peaked 10 on 17:00. The highest amount of peakcalls_ad was indefinitely more than the average."

Natural language insight: "At 17:00, peakcalls_ad peaked at 10—this was significantly (39%) higher than the average for this period."

Explanation: In this example, "indefinitely" is changed from the template-based insight to "39%" in the natural language insight.

Hallucination with a Change in Numerical Information Example 2

Template-based insight: "Throughout this period, the amount of visits topped 16,708 on January 4th. It was 123% more than the average."

Natural language insight: "On January 4th, the visits reached a peak of 16,708, which was considerably (122%) higher than the average for this period."

Explanation: In this example, "123%" is changed from the template-based insight to "122%" in the natural language insight.

For fixing errors (e.g. fix error 312B), in some embodiments, language models may generate a hallucination in the natural language insight that modifies one or more numerical values of facts of the template-based insight. In this case, $\mathcal{L}$ is non-empty because some fact is missing. In embodiments of gatekeeper 312, gatekeeper 312 only processes the single element $\mathcal{L}1$ in $\mathcal{L}$. In these embodiments of gatekeeper 312, if two or more facts are missing, gatekeeper 312 reports a failure in order to re-generate the natural language insight from the template-based insight. In certain cases, gatekeeper 312 can fix an error using the following process:

(1) search for a number (e.g., an integer) in $\mathbb{B}$;
(2) If no number is found, return failure (e.g., the fact is missing);
(3) if a number (e.g., an integer) is found, gatekeeper 312 checks the edit distance between the found number $\mathcal{N}$ and $\mathcal{L}1$:
 (i) if the edit distance is less than 2, replace $\mathcal{N}$ by $\mathcal{L}1$ in $\mathbb{C}$, also remove $\mathcal{N}$ from $\mathbb{B}$; and
 (ii) else report failure; and
(4) Return success.

For example, in this embodiment, if gatekeeper 312 finds a number in $\mathbb{B}$ for the following example $\mathbb{B}$: "The lowest number of visits was 831 which occurred on and was less than the average of." In this example, all other facts of $\mathbb{B}$ have been removed in the fact check step discussed above. In the example, the original template-based insight is: "The lowest amount of visits was 801, which occurred on 17:00 and was 73% less than the average of 2,947.746." As the edit distance between '831' and '801' is less than 2, gatekeeper 312 can replace '831' with '801' and fix the natural language insight, thus avoid re-running the language model and conserving computing resources.

For performing a redundancy check (e.g. redundancy check 312C), in some embodiments, a language model (e.g., language model 308) may generate a hallucination with redundant facts/insights. Examples of hallucinations with redundant facts/insights are provided as follows:

Hallucination with Redundant Facts Example 1

Template-based insight: "During this period between 4:00 PM and 4:00 PM, the amount of avgsessionsactive increased from 648.75 to 1,059.8, thus increasing 63%."

Natural language insight: "The avgsessionsactive grew by 63% from 648.75 to 1,059.8 between 4:00 PM and 4:00 PM, from 648.75 to 1,059.8."

Explanation: In this example, "from 648.75 to 1,059.8" is redundant as it does not appear twice in the template-based insight.

Hallucination with Redundant Facts Example 2

Template-based insight: "During this period between March 9th and March 9th, the amount of visits significantly increased from 2,858 to 11,782, thus growing 312%."

Natural language insight: "The visits significantly increased from 2,858 to 11,782 in the span between March 9th and March 9th, growing by 312% from 2,858 to 11,782."

Explanation: In this example, "from 2,858 to 11,782" is redundant as it does not appear twice in the template-based insight.

For performing a redundancy check (e.g. redundancy check 312C), if there is no redundancy in $\mathbb{C}$, there will be no number/integers in $\mathbb{B}$ as all facts have been masked out. Therefore, gatekeeper 312 searches for number again in $\mathbb{B}$. If there is any number, gatekeeper 312 will report a failure in order to re-generate the natural language insight from the template-based insight. Otherwise, $\mathbb{C}$ has successfully passed the gatekeeper 312 and can be presented to the user as output 314.

Further, as shown in FIG. 3, the template-based insights 306A and/or the natural insights 310 (after passing the gatekeeper) can be utilized to further train and fine-tune the language model 308 through model fine-tuning block 316. Model fine-tuning block 316 shows an exemplary flow for fine-tuning language model 308. As shown in block 316, template-based insights 306A are input into a language model with a large number of parameters 316A (e.g., Flan-T5 XXL™ from Google® or any language model or LLM with a larger number of parameters than language model with a smaller number of parameters 316D). The language model with the large number of parameters 316A requires significantly more computational power to train and run. The language model with the large number of parameters 316A outputs paraphrased samples 316B from the template-based insights 306A. The paraphrased samples 316B are checked by gatekeeper 312 for hallucination errors. The paraphrased samples 316B that pass gatekeeper 312 are used as training samples 316C to train a language model with a smaller number of parameters 316D than parameters in language model 316A. For example, Flan-T5 Small™ from Google® is shown in FIG. 3, but dependent on the size of language model 316A, any language model that is smaller than language model 316A can be utilized as language model 316D. In this regard, the language model with the smaller number of parameters 316D can be trained to provide a trained language model 308. The language model with the smaller number of parameters 316D requires less computational power, can run on less powerful machines, and reduces the size of the language model.

Exemplary Implementation of Hallucination Prevention for Natural Language Insights With reference now to FIGS. 4-7, flow diagrams are provided showing exemplary methods 400, 500, 600, and 700 related to hallucination prevention for natural language insights, in accordance with embodiments of the present technology. Each block of methods 400, 500, 600, and 700 comprises a computing process that can be performed using any combination of hardware, firmware, and/or software. For instance, various functions can be carried out by a processor executing instructions stored in memory. The method can also be embodied as computer-usable instructions stored on computer storage media. The method can be provided by a standalone application, a service or hosted service (standalone or in combination with another hosted service), or a plug-in to another product, to name a few. The method flows of FIGS. 4-7 are exemplary only and not intended to be limiting. As can be appreciated, in some embodiments, method flows 400-700 can be implemented, at least in part, to facilitate hallucination prevention for natural language insights in order to increase the reliability of insights generated by a language model.

Figure 4:
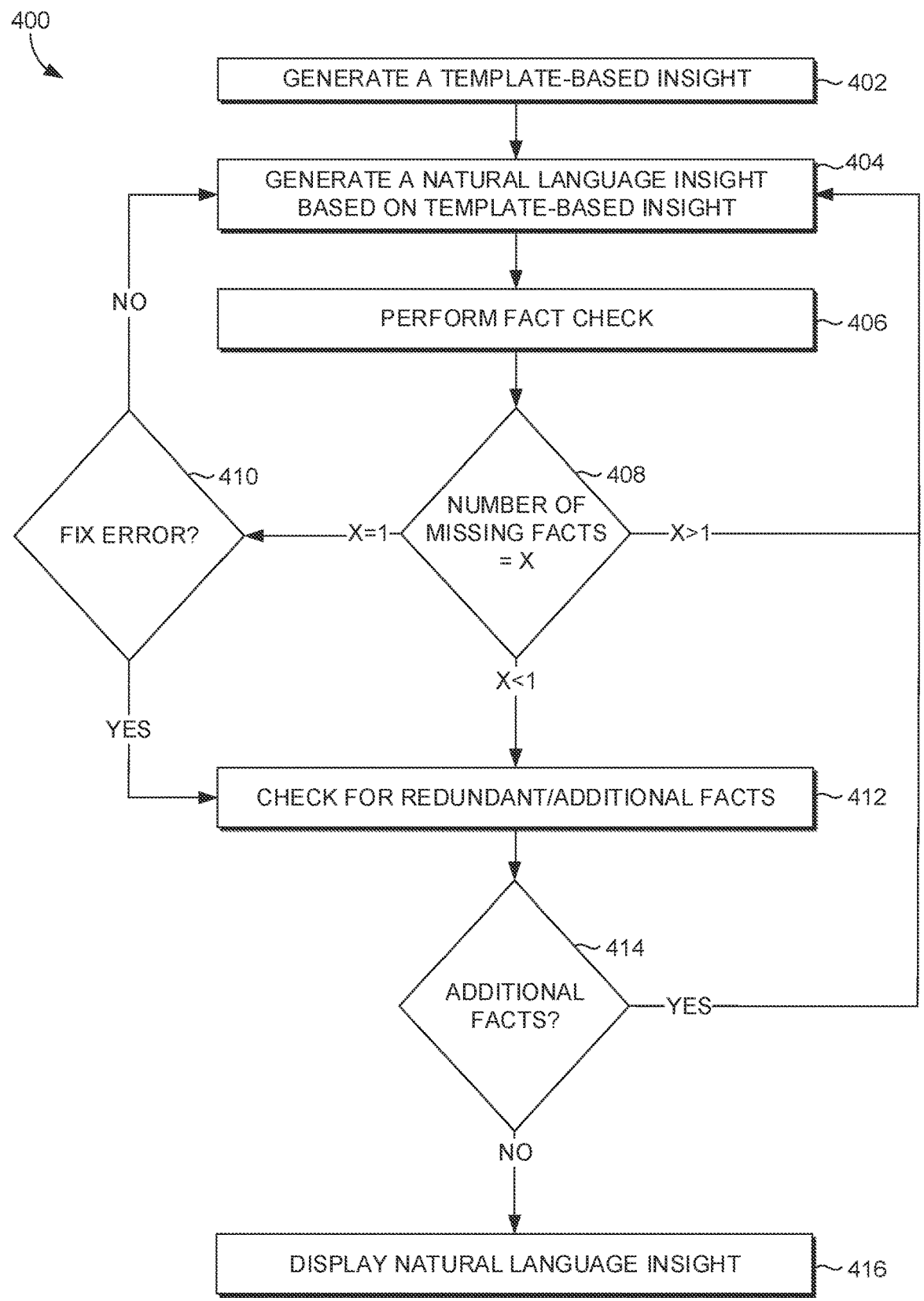
FIG. 4 is a process flow showing a method for implementing hallucination prevention for natural language insights, in accordance with embodiments of the present disclosure.

Turning initially to FIG. 4, a flow diagram is provided showing an embodiment of a method 400 for hallucination prevention for natural language insights in accordance with embodiments described herein. Such hallucination prevention for natural language insights can be used to efficiently and effectively prevent presentation of hallucinations generated in natural language insights in order to increase the reliability of insights generated by a language model. Initially, at block 402, a template-based insight is generated with one or more facts extrapolated from a dataset into a text template. In block 404, a natural language insight is generated by a language model from the template-based insight.

In block 406, the natural language insight is searched for each fact of the template-based insight. In block 408, the number of facts of the template-based insight missing from the natural language is determined. In embodiments, in block 408, if more than a particular number of facts (e.g., more than one) are missing from the natural language insight a new natural language insight is generated by the language model based on the template-based insight (e.g., restarting at block 404). In embodiments, in block 408, if a particular number of facts (e.g., one) are missing from the natural language insight, the method flow proceeds to block 410. In embodiments, in block 408, if less than a particular number of facts (e.g., less than one) are missing from the natural language insight, the method flow proceeds to block 412.

In embodiments where a particular number of facts (e.g., one) are missing from the natural language insight, in block 410, it is determined if any errors can be corrected to correct the missing fact(s). In embodiments, in block 410, if a fact (e.g., only one fact) of the template-based insight is missing from the natural language insight, and a similar integer or string can be identified in the natural language insight, the fact can be corrected before proceeding to block 412. In this regard, an erroneous fact(s) output by the language model into the natural language insight can be corrected (e.g., by the hallucination gatekeeper engine). In embodiments, in block 410, if a fact (e.g., only one fact) of the template-based insight is missing from the natural language insight and the fact is an integer, an integer can be identified in the natural language insight and replaced by the fact if the edit distance is below a threshold (e.g., less than two operations) before proceeding to block 412. In embodiments, in block 410, if the edit distance between the fact of the template-based insight missing from the natural language insight is more than a threshold (e.g., more than two operations), then a new natural language insight is generated by the language model based on the template-based insight (e.g., restarting at block 404).

In block 412, the natural language insight is checked for redundant or additional facts. In embodiments, in block 414, if there are redundant facts in the natural language insight, then a new natural language insight is generated by the language model based on the template-based insight (e.g., restarting at block 404). In embodiments, in block 414, if there are no redundant facts in the natural language insight, then the method flow proceeds to block 416. In embodiments, in block 414, if the number of facts of the natural language insight that include integers are greater than the number of facts of the template-based insight that include integers, then a new natural language insight is generated by the language model based on the template-based insight (e.g., restarting at block 404). In embodiments, in block 414, if the number of facts of the natural language insight that include integers are equal to the number of facts of the template-based insight that include integers, then the method flow proceeds to block 416. In block 416, the natural language insight is displayed for presentation to the user. In embodiments, if a natural language insight(s) generated based on the template-based insight fails the hallucinations check more than a threshold number of times (e.g., a natural language insight generated based on the template-based insight fails a hallucinations check and a new natural language insight generated based on the template-based insight is generated also fails a hallucination check), the template-based insight is displayed for presentation to the user instead of generating a new natural language insight based on the template-based insight.

Figure 5:
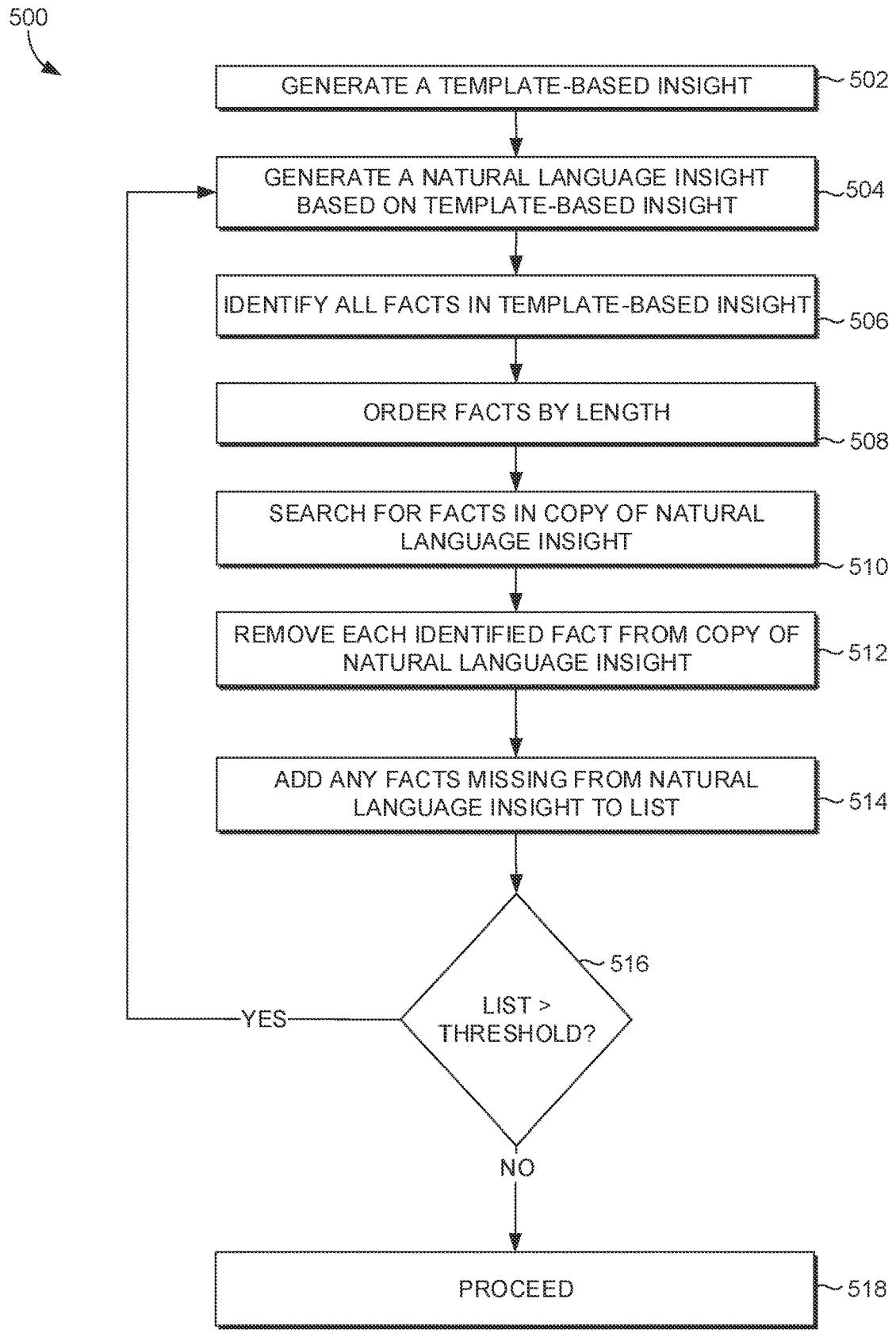
FIG. 5 is a process flow showing another method for implementing hallucination prevention for natural language insights, in accordance with embodiments of the present disclosure.

Turning now to FIG. 5, a flow diagram is provided showing an embodiment of a method 500 for hallucination prevention for natural language insights by checking the number of facts in the insight in accordance with embodiments described herein. Such hallucination prevention for natural language insights by checking the number of facts in the insight can be used to efficiently and effectively prevent presentation of hallucinations generated in natural language insights in order to increase the reliability of insights generated by a language model. Initially, at block 502, a template-based insight is generated with one or more facts extrapolated from a dataset into a text template. In block 504, a natural language insight is generated by a language model from the template-based insight.

In block 506, each of the facts of the template-based insight are identified and stored in a list. In block 508, the facts from the template-based insight are ordered in the list in terms of the corresponding length of the fact. In block 510, a copy of the natural language insight is made and the copy of the natural language insight is searched (e.g., in order of each fact's length starting with the fact with the greatest length) to determine whether each fact in the ordered list of facts from the template-based insight is located in the natural language insight. In block 512, for each fact in the ordered list of facts from the template-based insight that is found in the copy of the natural language insight, the fact is removed from the copy of the natural language insight. In block 514, for each fact in the ordered list of facts from the template-based insight that is not found in the copy of the natural language insight, the fact is added to a list of missing facts.

In block 516, if a particular number of facts in the list are greater than a threshold number of facts (e.g., more than one fact is missing in the natural language insight), a new natural language insight is generated by the language model based on the template-based insight (e.g., restarting at block 504). In embodiments, if a natural language insight(s) generated based on the template-based insight fails the hallucination check more than a threshold number of times, the template-based insight is displayed for presentation to the user instead of generating a new natural language insight based on the template-based insight. In block 516, if a particular number of facts in the list are less than or equal to a threshold number of facts (e.g., no facts are missing in the natural language insight or one fact is missing in the natural language insight), in block 518, the method flow proceeds to the new step. In some embodiments, in block 518, the natural language insight is displayed for presentation to the user. In some embodiments, in block 518, errors can be corrected. In some embodiments, in block 518, a check for redundant or additional facts is performed.

Figure 6:
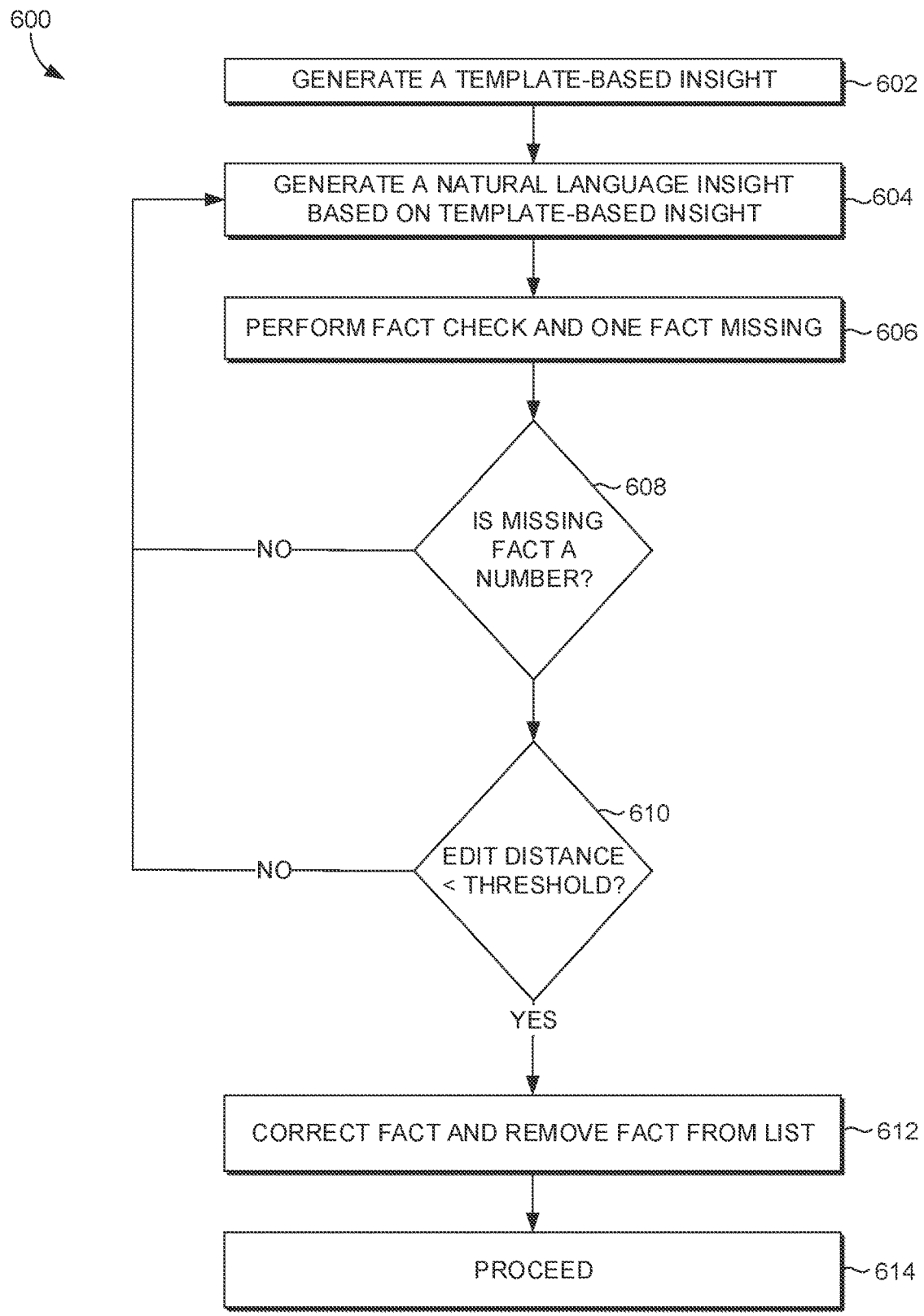
FIG. 6 is a process flow showing another method for implementing hallucination prevention for natural language insights, in accordance with embodiments of the present disclosure.

Turning now to FIG. 6, a flow diagram is provided showing an embodiment of a method 600 for hallucination prevention for natural language insights by correcting hallucination errors in accordance with embodiments described herein. Such hallucination prevention for natural language insights by correcting hallucination errors can be used to efficiently and effectively prevent presentation of hallucinations generated in natural language insights in order to increase the reliability of insights generated by a language model and decrease computer resource utilization when re-running a language model. Initially, at block 602, a template-based insight is generated with one or more facts extrapolated from a dataset into a text template. In block 604, a natural language insight is generated by a language model from the template-based insight.

In block 606, the method flow 500 is performed and a particular number of facts in the list of facts from the template-based insight equal to a threshold number of facts (e.g., one fact is missing in the natural language insight) is confirmed (e.g., in block 516). In block 608, it is determined whether the missing fact is a number. If the missing fact is not a number (e.g., not an integer), at block 608, a new natural language insight is generated by the language model based on the template-based insight (e.g., restarting at block 604). In embodiments, if a natural language insight(s) generated based on the template-based insight fails the hallucination check more than a threshold number of times, the template-based insight is displayed for presentation to the user instead of generating a new natural language insight based on the template-based insight.

If the missing fact is indeed a number (e.g., an integer), at block 608, the method flow proceeds to block 610. In block 610, it is determined whether a remaining integer in the copy of the natural language insight is less than a threshold edit distance (e.g., less than two operations) from the missing fact in the list. If there is no fact in the natural language insight less than the threshold distance from the missing fact in the list, in block 610, a new natural language insight is generated by the language model based on the template-based insight (e.g., restarting at block 604). Again, in embodiments, if a natural language insight(s) generated based on the template-based insight fails the hallucination check more than a threshold number of times, the template-based insight is displayed for presentation to the user instead of generating a new natural language insight based on the template-based insight.

In block 610, if there is a fact (e.g., an incorrect fact) in the natural language insight that is less than the threshold distance from the missing fact in the list, the method flow proceeds to block 612. In block 612, the fact in the natural language insight (e.g., the incorrect fact), which is less than the threshold distance from the fact in the list of facts of the template-based insight not found in the natural language insight, is replaced by the fact in the list of the template-based insight that was not found in the natural language insight (e.g., the incorrect fact is replaced with the correct fact). Further, in block 612, after replacing the incorrect fact of the natural language insight with the correct fact from the template-based insight, the correct fact is removed from the list of facts of the template-based insight not found in the natural language insight. Even further, in block 612, after replacing the incorrect fact of the natural language insight with the correct fact from the template-based insight, the incorrect fact is removed from the copy of the natural language insight (e.g., as discussed in block 512). In block 614, the method flow proceeds to the next step. In some embodiments, in block 614, the natural language insight is displayed for presentation to the user. In some embodiments, in block 614, a check for redundant or additional facts is performed.

Figure 7:
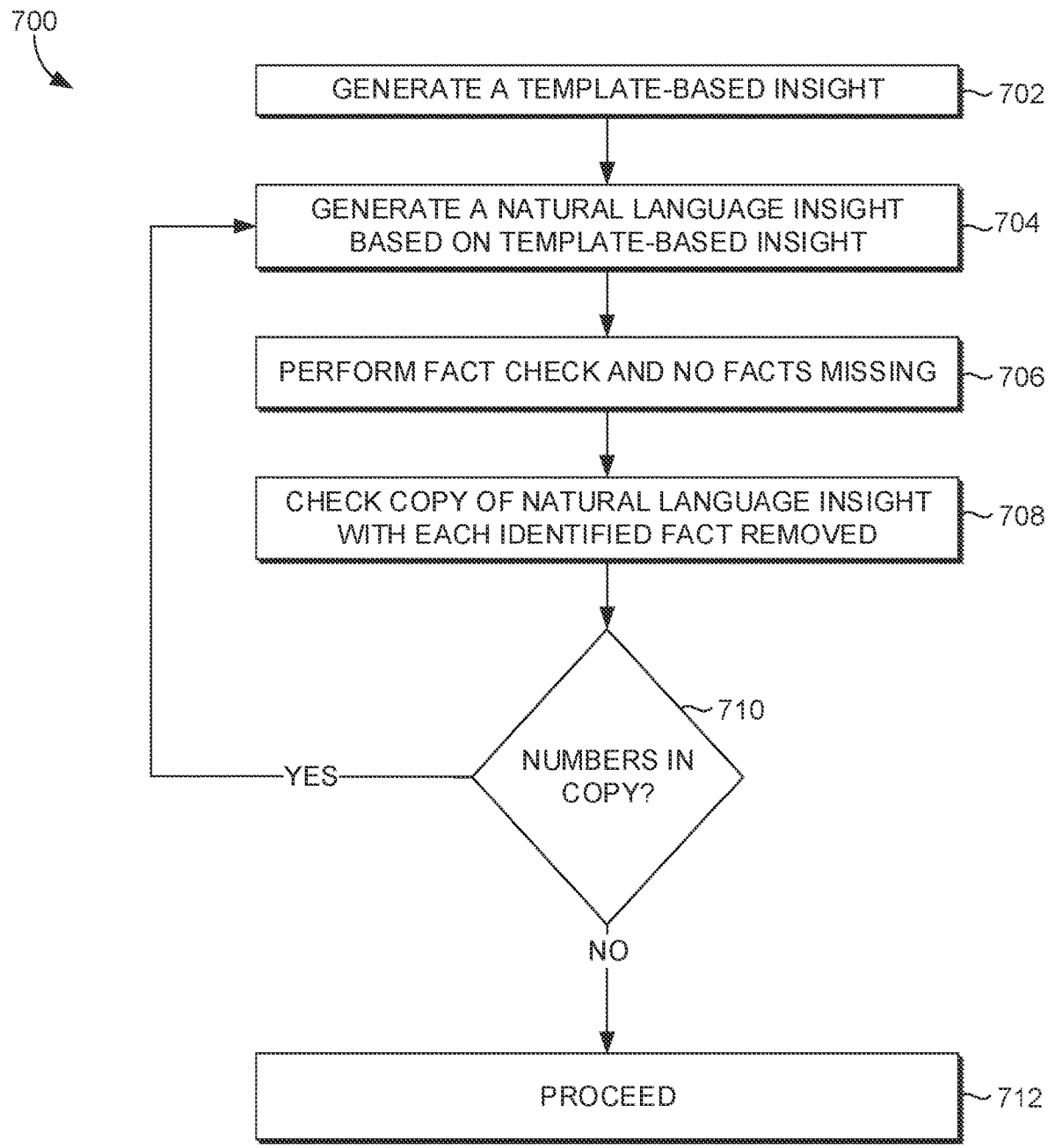
FIG. 7 is a process flow showing another method for implementing hallucination prevention for natural language insights, in accordance with embodiments of the present disclosure.

Turning now to FIG. 7, a flow diagram is provided showing an embodiment of a method 700 for hallucination prevention for natural language insights by checking for redundant or additional facts in accordance with embodiments described herein. Such hallucination prevention for natural language insights by checking for redundant or additional facts can be used to efficiently and effectively prevent presentation of hallucinations generated in natural language insights in order to increase the reliability of insights generated by a language model. Initially, at block 702, a template-based insight is generated with one or more facts extrapolated from a dataset into a text template. In block 704, a natural language insight is generated by a language model from the template-based insight.

In block 706, the method flow 500 (and, in some embodiments, the error correction of method flow 600) is performed and no facts remain in the list of facts from the template-based insight as no facts in the template-based insight are missing from the natural language insight (e.g., block 516) or any facts previously missing are now corrected and removed from the list (e.g., block 612). In block 708, the copy of the natural language insight (e.g., the copy of natural language insight from method flow 500 where all identified facts of the template-based insight were removed in block 512 and/or block 612) is checked to determine whether any numbers (e.g., integers) remain in the copy of the natural language insight.

In block 710, if there a threshold number of numbers (e.g., one integer) in the copy of the natural language insight after all identified facts of the template-based insight were removed, a new natural language insight is generated by the language model based on the template-based insight (e.g., restarting at block 704). In embodiments, if a natural language insight(s) generated based on the template-based insight fails the hallucination check more than a threshold number of times, the template-based insight is displayed for presentation to the user instead of generating a new natural language insight based on the template-based insight.

In block 710, if there is less than a threshold number of numbers (e.g., there are no integers) in the copy of the natural language insight after all identified facts of the template-based insight were removed, in block 712, the method flow proceeds to the next step. In some embodiments, in block 714, the natural language insight is displayed for presentation to the user.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 8:
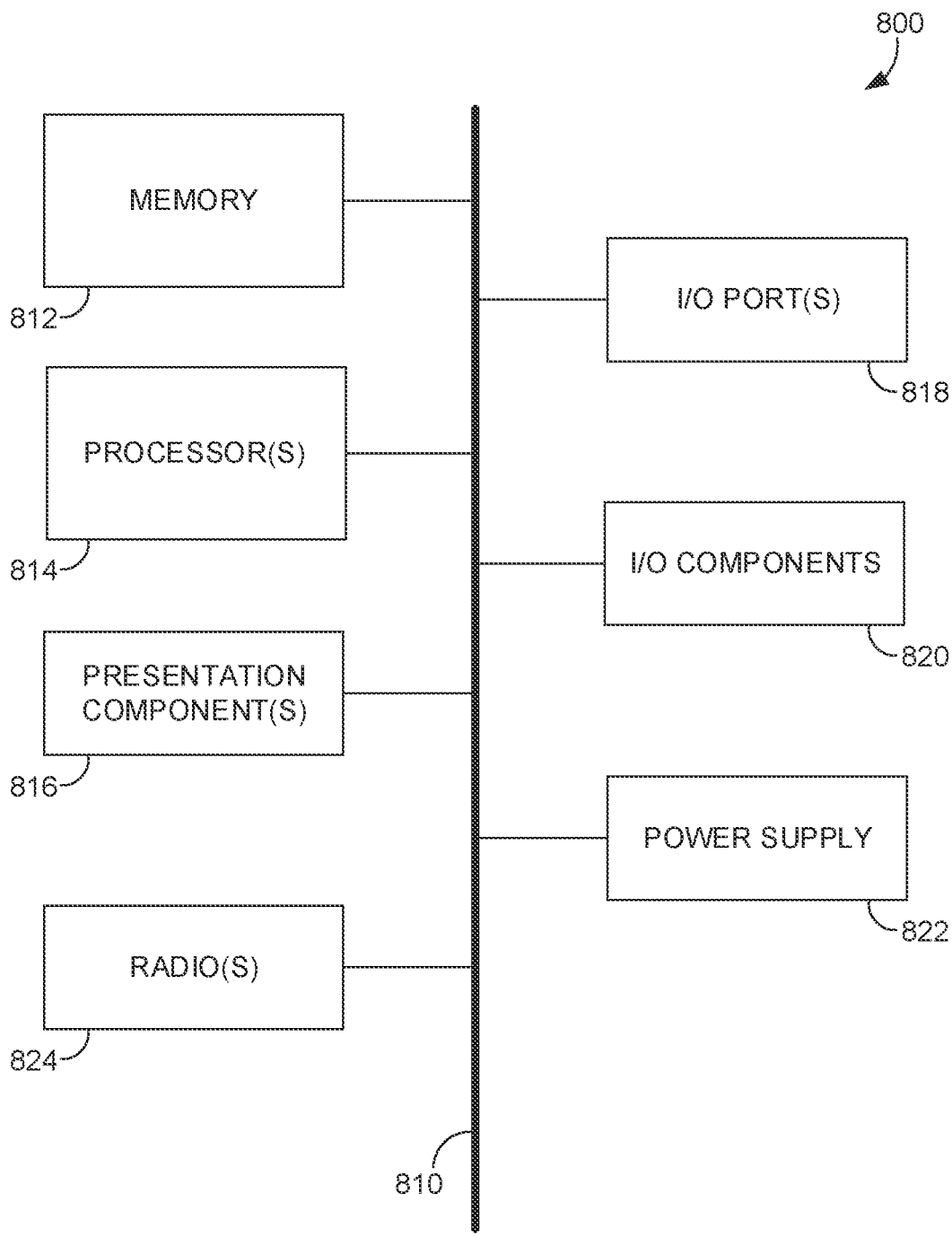
FIG. 8 is a block diagram of an example computing device in which embodiments of the present disclosure can be employed.

Referring to the drawings in general, and initially to FIG. 8 in particular, an exemplary operating environment for implementing aspects of the technology described herein is shown and designated generally as computing device 800. Computing device 800 is just one example of a suitable computing environment and is not intended to suggest any limitation as to the scope of use or functionality of the technology described herein. Neither should the computing device 800 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, an illustrative power supply 822, and a radio(s) 524. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 8 is merely illustrative of an exemplary computing device that can be used in connection with one or more aspects of the technology described herein. Distinction is not made between such categories as "workstation," "server," "laptop," and "handheld device," as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile and/or nonvolatile memory. The memory 812 may be removable, non-removable, or a combination thereof. Exemplary memory includes solid-state memory, hard drives, and optical-disc drives. Computing device 800 includes one or more processors 814 that read data from various entities such as bus 810, memory 812, or I/O components 820. Presentation component(s) 816 present data indications to a user or other device. Exemplary presentation components 816 include a display device, speaker, printing component, and vibrating component. I/O port(s) 818 allow computing device 800 to be logically coupled to other devices including I/O components 820, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 800. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

A computing device may include radio(s) 524. The radio 524 transmits and receives radio communications. The computing device may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

The invention claimed is:

1. A computer-implemented method comprising:
    generating, by a template-based insights engine, a template-based insight with a set of facts from a set of data, the template-based insight being generated in text form based on a text template;
    generating, by a language model, a natural language insight from the template-based insight;
    before causing display of the natural language insight, determining, by a hallucination gatekeeper engine, a threshold number of facts from the set of facts of the template-based insight missing from the natural language insight by:
        searching the natural language insight for each fact in the set of facts of the template-based insight in order of a corresponding string length of each fact; and
        based on the search, determining that the threshold number of facts in the set of facts are missing from the natural language insight;
    based on the threshold number of facts from the set of facts of the template-based insight missing from the natural language insight, automatically generating, by the language model, a new natural language insight from the template-based insight; and
    causing display of the new natural language insight instead of the natural language insight.

2. The computer-implemented method of claim 1, wherein the set of facts include integers and strings generated from the set of data.

3. The computer-implemented method of claim 1, wherein the threshold number of facts is greater than one.

4. The computer-implemented method of claim 1, further comprising:
    determining, by the hallucination gatekeeper engine, only a single fact from the set of facts of the template-based insight to be missing from the new natural language insight; and
    based on only the single fact from the set of facts of the template-based insight missing from the new natural language insight:
        identifying the single fact as an integer;
        identifying whether a remaining fact of the new natural language insight is a different integer;
        based on the different integer being less than a threshold edit distance from the integer, automatically replacing, by the hallucination gatekeeper engine, the different integer of the new natural language insight with the integer; and
        causing display of the new natural language insight with the integer.

5. The computer-implemented method of claim 1, further comprising:
    determining, by the hallucination gatekeeper engine, that a corresponding set of facts in the new natural language insight matches the set of facts of the template-based insight; and
    based on the corresponding set of facts in the new natural language insight matching the set of facts of the template-based insight, automatically causing display of the new natural language insight.

6. The computer-implemented method of claim 1, further comprising:
    determining, by the hallucination gatekeeper engine, that a corresponding number of facts with integers in the new natural language insight is greater than a number of facts with integers in the set of facts of the template-based insight;
    based on the corresponding number of facts with integers in the new natural language insight being greater than the number of facts with integers in the set of facts of the template-based insight, automatically generating, by the language model, a further new natural language insight from the template-based insight; and
    causing display of the further new natural language insight instead of the new natural language insight.

7. The computer-implemented method of claim 1, further comprising:
    causing fine-tuning of a different language model to generate natural language insights from template-based insights using the template-based insight and the new natural language insight.

8. A non-transitory computer-readable medium storing executable instructions, which when executed by a processing device, cause the processing device to perform operations comprising:
  generating, by a template-based insights engine, a template-based insight with a set of facts generated from a set of data, the template-based insight being generated in text form based on a text template;
  generating, by a language model, a natural language insight from the template-based insight;
  before causing display of the natural language insight:
    searching the natural language insight for each fact in the set of facts of the template-based insight in order of a corresponding string length of each fact;
    based on the search, determining only a single fact from the set of facts of the template-based insight to be missing from the natural language insight; and
    based on only the single fact from the set of facts of the template-based insight missing from the natural language insight:
      identifying the single fact as an integer;
      identifying whether a remaining fact of the natural language insight is a different integer; and
      based on the different integer being greater than a threshold edit distance from the integer, automatically generating, by the language model, a new natural language insight from the template-based insight; and
  causing display of the new natural language insight instead of the natural language insight.

9. The non-transitory computer-readable medium of claim 8, wherein the threshold edit distance is one.

10. The non-transitory computer-readable medium of claim 8, the operations further comprising:
  determining only a single corresponding fact from the set of facts of the template-based insight to be missing from the new natural language insight; and
  based on only the single corresponding fact from the set of facts of the template-based insight missing from the new natural language insight:
    identifying the single fact as a corresponding integer;
    identifying whether a corresponding remaining fact of the new natural language insight is a different corresponding integer;
    based on the different corresponding integer being less than the threshold edit distance from the corresponding integer, automatically replacing the different corresponding integer of the new natural language insight with the corresponding integer; and
  causing display of the new natural language insight with the corresponding integer.

11. The non-transitory computer-readable medium of claim 8, the operations further comprising:
  determining a corresponding set of facts in the new natural language insight matches the set of facts of the template-based insight; and
  based on the corresponding set of facts in the new natural language insight matching the set of facts of the template-based insight, automatically causing display of the new natural language insight.

12. The non-transitory computer-readable medium of claim 8, the operations further comprising:
  determining that a corresponding number of facts with integers in the new natural language insight is greater than a number of facts with integers in the set of facts of the template-based insight;
  based on the corresponding number of facts with integers in the new natural language insight being greater than the number of facts with integers in the set of facts of the template-based insight, automatically generating, by the language model, a further new natural language insight from the template-based insight; and
  causing display of the further new natural language insight instead of the new natural language insight.

13. The non-transitory computer-readable medium of claim 8, the operations further comprising:
  determining a threshold number of facts from the set of facts of the template-based insight missing from the new natural language insight;
  based on the threshold number of facts from the set of facts of the template-based insight missing from the new natural language insight, automatically generating, by the language model, a further new natural language insight from the template-based insight; and
  causing display of the further new natural language insight instead of the new natural language insight.

14. The non-transitory computer-readable medium of claim 8, the operations further comprising:
  causing fine-tuning of a different language model to generate natural language insights from template-based insights using the template-based insight and the new natural language insight.

15. A computing system comprising:
  a processor; and
  a non-transitory computer-readable medium having stored thereon instructions that when executed by the processor, cause the processor to perform operations including:
    generating, by a template-based insights engine, a template-based insight with a set of facts generated from a set of data, the template-based insight being generated in text form based on a text template;
    generating, by a language model, a natural language insight from the template-based insight;
    before causing display of the natural language insight:
      searching, by a hallucination gatekeeper engine, the natural language insight for each fact in the set of facts of the template-based insight in order of a corresponding string length of each fact;
      based on the search, determining, by the hallucination gatekeeper engine, that a corresponding number of facts in the natural language insight is greater than a number of facts in the set of facts of the template-based insight; and
      based on the corresponding number of facts in the natural language insight being greater than the number of facts in the set of facts of the template-based insight, automatically generating, by the language model, a new natural language insight from the template-based insight; and
    causing display of the new natural language insight instead of the natural language insight.

16. The system of claim 15, wherein the instructions that when executed by the processor, cause the processor to perform operations further including:
  determining, by the hallucination gatekeeper engine, a threshold number of facts from the set of facts of the template-based insight missing from the new natural language insight;
  based on the threshold number of facts from the set of facts of the template-based insight missing from the new natural language insight, automatically generating, by the language model, a further new natural language insight from the template-based insight; and causing display of the further new natural language insight instead of the new natural language insight.

17. The system of claim 15, wherein the instructions that when executed by the processor, cause the processor to perform operations further including:
    determining, by the hallucination gatekeeper engine, only a single fact from the set of facts of the template-based insight to be missing from the new natural language insight; and
    based on only the single fact from the set of facts of the template-based insight missing from the new natural language insight:
        identifying the single fact as an integer;
        identifying whether a remaining fact of the new natural language insight is a different integer;
        based on the different integer being less than a threshold edit distance from the integer, automatically replacing, by the hallucination gatekeeper engine, the different integer of the new natural language insight with the integer; and
        causing display of the new natural language insight with the integer.

18. The system of claim 15, wherein the instructions that when executed by the processor, cause the processor to perform operations further including:
    determining, by the hallucination gatekeeper engine, that a corresponding set of facts in the new natural language insight matches the set of facts of the template-based insight; and
    based on the corresponding set of facts in the new natural language insight matching the set of facts of the template-based insight, automatically causing display of the new natural language insight.

19. The system of claim 15, wherein the instructions that when executed by the processor, cause the processor to perform operations further including:
    determining, by the hallucination gatekeeper engine, that a new corresponding number of facts with integers in the new natural language insight is greater than the number of facts with integers in the set of facts of the template-based insight;
    based on the new corresponding number of facts with integers in the new natural language insight being greater than the number of facts with integers in the set of facts of the template-based insight, automatically generating, by the language model, a further new natural language insight from the template-based insight; and
    causing display of the further new natural language insight instead of the new natural language insight.

20. The system of claim 15, wherein the instructions that when executed by the processor, cause the processor to perform operations further including:
    causing fine-tuning of a different language model to generate natural language insights from template-based insights using the template-based insight and the new natural language insight.

* * * * *